(12) United States Patent
Law et al.

(10) Patent No.: US 8,374,094 B2
(45) Date of Patent: Feb. 12, 2013

(54) METHODS AND SYSTEMS TO VERIFY A COMMUNICATION PATH BETWEEN A FIELD DEVICE AND A PROCESS CONTROLLER IN A PROCESS CONTROL SYSTEM

(75) Inventors: Gary Law, Georgetown, TX (US);
Brandon Hieb, Cedar Park, TX (US);
David R. Denison, Austin, TX (US);
Cheyenne Hernandez, New Manila Quezon (PH)

(73) Assignee: Fisher-Rosemount Systems, Inc, Round Rock, TX (US)

( * ) Notice: Subject to any disclaimer, the term of this patent is extended or adjusted under 35 U.S.C. 154(b) by 912 days.

(21) Appl. No.: 12/333,074

(22) Filed: Dec. 11, 2008

(65) Prior Publication Data

US 2010/0149997 A1  Jun. 17, 2010

(51) Int. Cl.
*G06F 11/00* (2006.01)
*H04J 3/14* (2006.01)
*H04L 1/00* (2006.01)
*H04L 12/26* (2006.01)

(52) U.S. Cl. .................... 370/248; 370/241; 370/401

(58) Field of Classification Search .................. 370/278, 370/242, 217, 241, 244, 248, 252, 400, 401; 710/316
See application file for complete search history.

(56) References Cited

U.S. PATENT DOCUMENTS

| | | |
|---|---|---|
| 5,158,464 A | 10/1992 | Landrini |
| 5,432,711 A | 7/1995 | Jackson et al. |
| 5,828,851 A | 10/1998 | Nixon et al. |
| 6,185,638 B1 * | 2/2001 | Beardsley et al. .............. 710/36 |

(Continued)

FOREIGN PATENT DOCUMENTS

| | | |
|---|---|---|
| GB | 2013933 | 8/1979 |
| JP | 11296220 | 10/1999 |

(Continued)

OTHER PUBLICATIONS

UK Intellectual Property Office, "UK Search Report" dated Dec. 6, 2007, in connection with British Application No. GB0718038.3 (3 pages).

(Continued)

*Primary Examiner* — Chuong T Ho
(74) *Attorney, Agent, or Firm* — Hanley, Flight & Zimmerman, LLC

(57) ABSTRACT

Example methods and systems to verify a communication path between a field device and a process controller in a process control system are disclosed. A disclosed example method includes transmitting via a first wireless communication path to a first portion of a process control system associated with one of the field device or the process controller, a command signal from a verification controller. In response to receiving the command signal in the first portion of the process control system, transmitting a verification signal via a first wired communication path from the first portion of the process control system to a second portion of the process control system associated with the other one of the field device or the process controller. Then, in response to receiving the verification signal in the second portion of the process control system, transmitting a reception signal via a second wireless communication path from the second portion of the process control system to the verification controller and in response to receiving the verification signal in the verification controller, verifying the communication path between the field device and the process controller.

26 Claims, 11 Drawing Sheets

U.S. PATENT DOCUMENTS

| | | | |
|---|---|---|---|
| 6,192,281 B1 | 2/2001 | Brown et al. | |
| 6,266,726 B1 | 7/2001 | Nixon et al. | |
| 7,433,450 B2* | 10/2008 | Burns et al. | 379/9 |
| 7,616,577 B2* | 11/2009 | Burns et al. | 370/241 |
| 7,869,372 B2* | 1/2011 | Robertson et al. | 370/241 |
| 2003/0014536 A1 | 1/2003 | Christensen et al. | |
| 2005/0068972 A1* | 3/2005 | Burns et al. | 370/412 |
| 2005/0135392 A1* | 6/2005 | Burns et al. | 370/401 |
| 2006/0221818 A1* | 10/2006 | Alves et al. | 370/217 |
| 2006/0241913 A1 | 10/2006 | De Groot et al. | |
| 2007/0233323 A1 | 10/2007 | Wiemeyer et al. | |
| 2007/0297338 A1* | 12/2007 | Mou et al. | 370/242 |
| 2008/0126665 A1* | 5/2008 | Burr et al. | 710/316 |
| 2008/0189441 A1* | 8/2008 | Jundt et al. | 710/3 |
| 2009/0080337 A1* | 3/2009 | Burns et al. | 370/248 |
| 2009/0135725 A1* | 5/2009 | Tanaka et al. | 370/241 |
| 2010/0077111 A1* | 3/2010 | Holmes et al. | 710/33 |

FOREIGN PATENT DOCUMENTS

| | | |
|---|---|---|
| WO | 0123971 | 4/2001 |
| WO | 0131407 | 5/2001 |
| WO | 03013104 | 2/2003 |
| WO | 2006071364 | 7/2006 |

OTHER PUBLICATIONS

United States Patent and Trademarj Office, "PCT International Search Report" dated Dec. 20, 2008, in connection with International Application No. PCT/US02/21698 (2 pages).

Gary Jr., James O., "Integration Foundation Fieldbus into a Distributed Control System" Foundation in the Real World Seminar, Amsterdam, Nov. 30, 2008 (35 pages).

UK Intellectual Property Office, "Examination Opinion" dated Apr. 22, 2008, in connection with Application No. GB0800692 (1 page).

UK Intellectual Property Office, "Search Report under Section 17" dated Apr. 21, 2008, in connection with Application No. GB0800692.6 (1 page).

United Kingdom Intellectual Property Office, "Search Report," issued in connection with British application serial No. GB0921620, Mar. 12, 2010, 1 page.

Letter Accompanying British Search Report Dated Mar. 12, 2010, issued by the United Kingdom Intellectual Property Office on Mar. 15, 2010, in connection with British Application No. GB0921620.1, 2 pages.

* cited by examiner

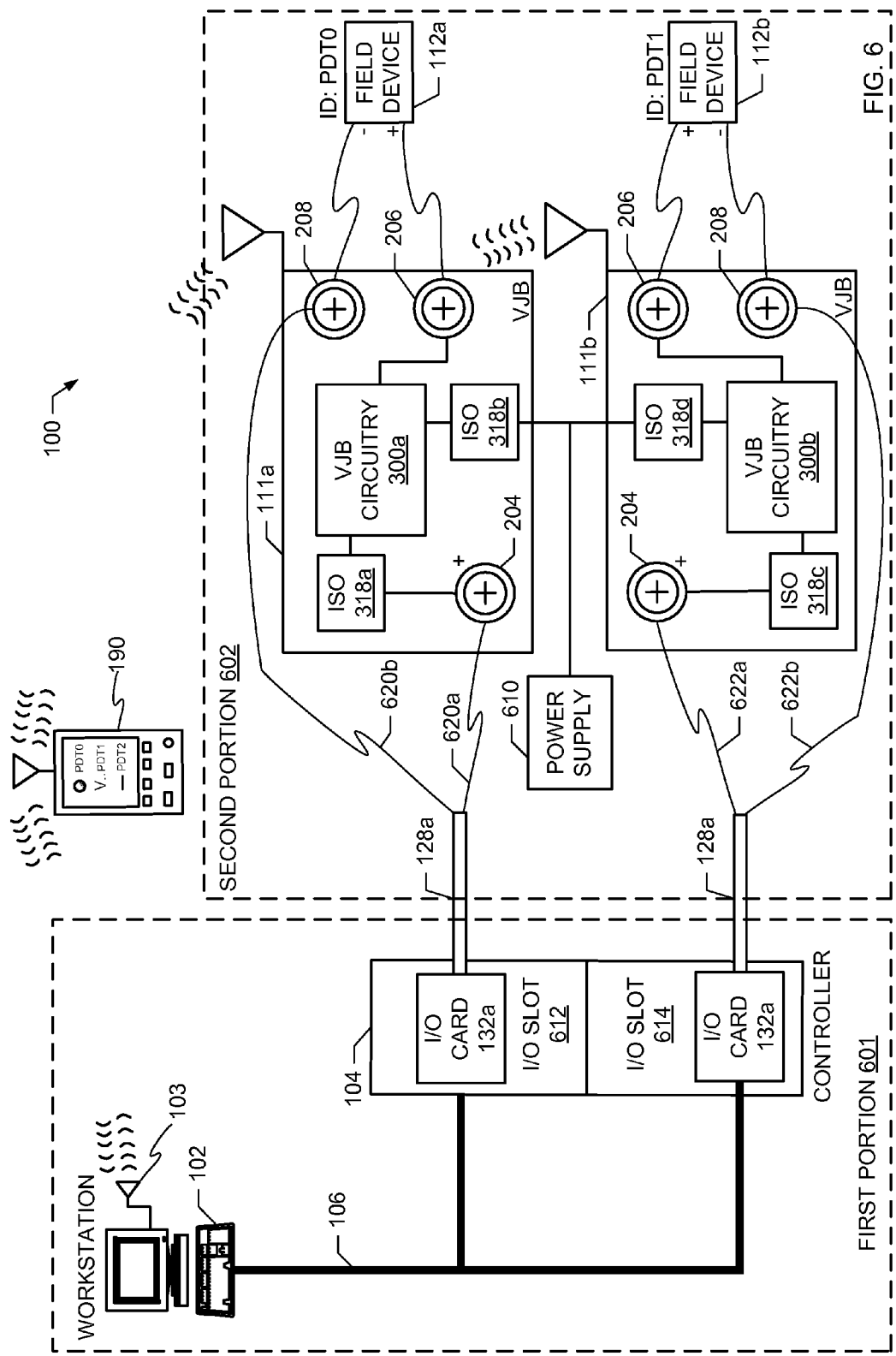

METHODS AND SYSTEMS TO VERIFY A COMMUNICATION PATH BETWEEN A FIELD DEVICE AND A PROCESS CONTROLLER IN A PROCESS CONTROL SYSTEM

FIELD OF THE DISCLOSURE

The present disclosure relates generally to process control systems and, more particularly, to methods and systems to verify a communication path between a field device and a process controller in a process control system.

BACKGROUND

Process control systems, like those used in chemical, petroleum, pharmaceutical, pulp and paper, or other manufacturing processes, typically include one or more process controllers communicatively coupled to at least one host including at least one operator workstation and to one or more field devices configured to communicate via analog, digital or combined analog/digital communication protocols. The field devices, which may be, for example, device controllers, valves, valve actuators, valve positioners, switches and transmitters (e.g., temperature, pressure, flow rate, and chemical composition sensors) or combinations thereof, perform functions within the process control system such as opening or closing valves and measuring or inferring process parameters. A process controller receives signals indicative of process measurements made by the field devices and/or other information pertaining to the field devices, uses this information to implement a control routine, and generates control signals that are sent over the buses or other communication lines to the field devices to control the operation of the process control system.

A process control system can include a plurality of field devices that provide several different functional capabilities and that are often communicatively coupled to process controllers using two-wire interfaces in a point-to-point (e.g., one field device communicatively coupled to a field device bus) or a multi-drop (e.g., a plurality of field device communicatively coupled to a field device bus) wiring connection arrangements or with wireless communications. Some field devices are configured to operate using relatively simple commands and/or communications (e.g., an ON command and an OFF command). Other field devices are more complex requiring more commands and/or more communication information, which may or may not include simple commands. For example, more complex field devices may communicate analog values with digital communications superimposed on the analog value using, for example, a Highway Addressable Remote Transducer ("HART") communication protocol. Other field devices can use entirely digital communications (e.g., a FOUNDATION Fieldbus communication protocol).

In a process control system, each field device is typically coupled to a process controller via one or more I/O cards and a respective communication path (e.g., a two-wire cable, a wireless link, or an optical fiber). Thus, a plurality of communication paths are required to communicatively couple a plurality of field devices to a process controller. Often the plurality of communication media coupled to the field devices are routed through one or more field junction boxes, at which point, the plurality of communication media are coupled to respective communication media (e.g., respective two-wire conductors) of a multi-conductor cable used to communicatively couple the field devices to the process controller via one or more I/O cards.

SUMMARY

Example methods and systems to verify a communication path between a field device and a process controller in a process control system are described. A disclosed example method includes transmitting via a first wireless communication path to a first portion of a process control system associated with one of the field device or the process controller, a command signal from a verification controller. In response to receiving the command signal in the first portion of the process control system, transmitting a verification signal via a first wired communication path from the first portion of the process control system to a second portion of the process control system associated with the other one of the field device or the process controller. Furthermore, in response to receiving the verification signal in the second portion of the process control system, transmitting a reception signal via a second wireless communication path from the second portion of the process control system to the verification controller and in response to receiving the verification signal in the verification controller, verifying the communication path between the field device and the process controller.

A disclosed example apparatus includes a verification controller to transmit a command signal associated with one of a field device or a process controller via a first wireless communication path to a first portion of a process control system and to receive a reception signal associated with the other one of the field device of the process controller via a second wireless communication path from a second portion of the process control system. Additionally, the example verification controller is to verify a first wired communication path between the first portion of the process control system and the second portion of the process control system.

A disclosed example system includes a verification junction box to transmit a verification signal via a first wired communication path in response to receiving a command signal from a verification controller or to transmit a reception signal via a first wireless communication path in response to receiving the verification signal via the first wired communication path.

BRIEF DESCRIPTION OF THE DRAWINGS

FIG. 6 is a block diagram illustrating a portion of the example process control system of FIG. 1 including example communication paths between the verification controller, the verification junction boxes, the process controller and/or the workstation of FIGS. 1, 2 and 3.

Figure 10:
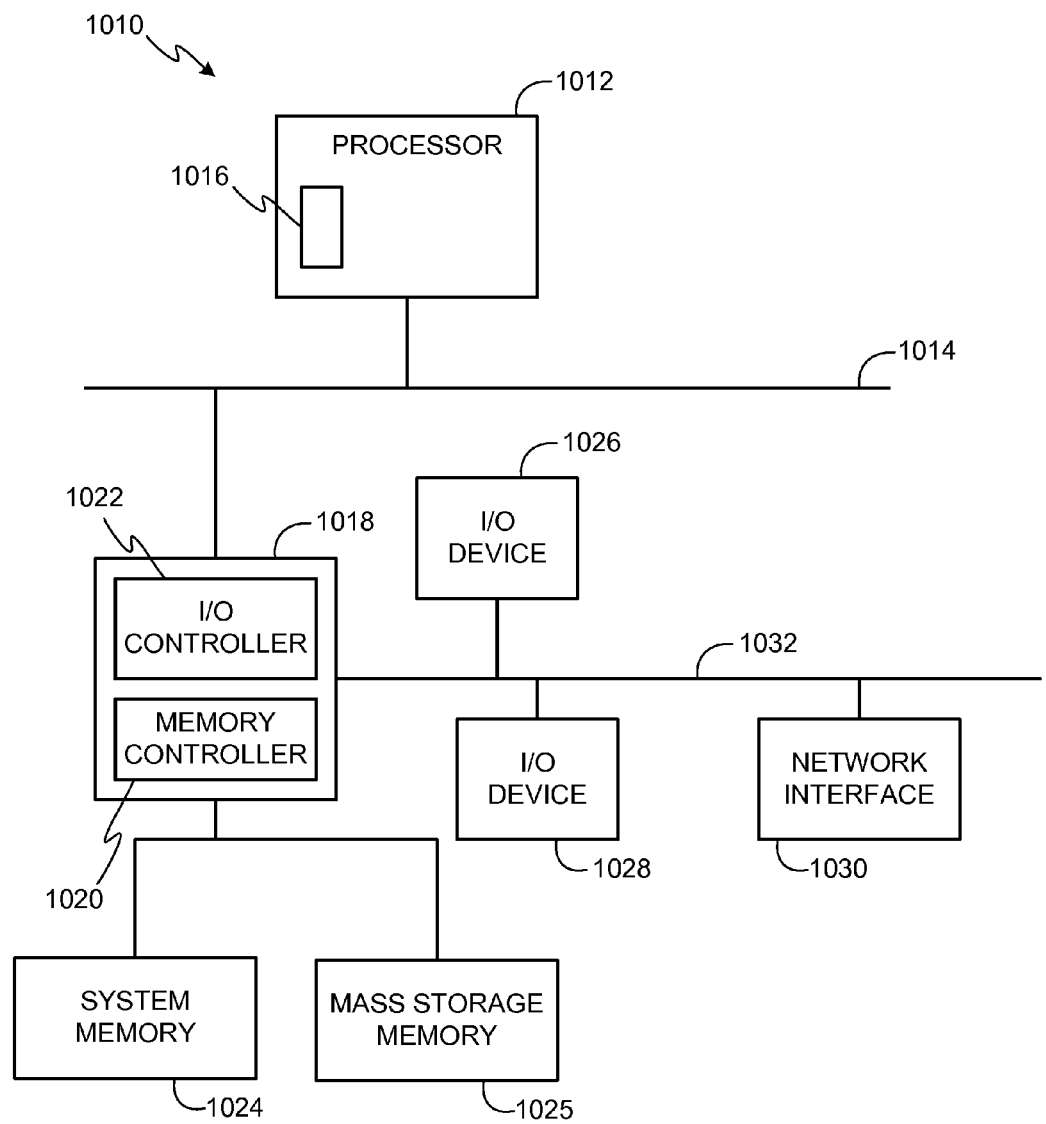

FIG. 10 is a block diagram of an example processor system that may be used to implement the example methods and systems described herein.

DETAILED DESCRIPTION

Although the following describes example methods and systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example methods and systems, the examples provided are not the only way to implement such methods and systems.

In a modern process control system, Input/Output (I/O) checkout (e.g., I/O verification) is a process by which the wiring between a process controller and a field device is validated. Traditionally, I/O verification is a time consuming task that involves multiple process control personnel and third party checkout equipment. The process to perform I/O verification includes physically connecting wires from a process controller to a field device and verifying in a control system communicatively coupled to the process controller that the correct field device is connected to the designated slot (e.g., I/O card) in the process controller.

The verification process for each field device is typically executed in multiple stages. First, the continuity of the wiring is checked using an insulation tester (e.g., a Megger™, an Ohm Meter, and/or a Fluke™). Next, a connection between the field device and the process control system is checked. Then, the response from the field device is functionally checked. However, performing I/O checkout in this manner is inefficient because each step must be preformed separately and at different physical locations. As a result, I/O verification consumes excess time and may require coordination with multiple process control personnel. For example, when a wire is installed with reverse polarity, the error is not detected during the wire continuity check and may only later be discovered during the response test of the field device. In another example, each of multiple field devices may be connected to an I/O card and the I/O cards may contain hundreds of slots to connect to each of the field devices. If one field device is connected to a wrong slot and/or a wrong I/O card, the process control personnel may spend hours trying to discover the error and determine the correct connection. Additionally, to correct connection errors and/or reverse polarity errors, process control personnel must typically be present at both the process control system and the field device.

The example methods and systems described herein enable the I/O verification process to be completed in a single step and performed by a single process control personnel in a single physical location. The examples described herein enable process control personnel to verify the connectivity of the process control system by connecting a verification junction box (VJB) between each field device and a respective I/O card connected to a process controller. The VJB is installed at the time each field device is installed into the process control system. Then, the process control personnel use a verification controller to communicate with the VJB and the process controller to verify the process controller is communicatively coupled to the VJB and the field device. Additionally, the verification controller can determine which I/O card is connected to which field device if there is a misconnection and can determine when polarity is reversed between the process controller and the field device.

Figure 1:
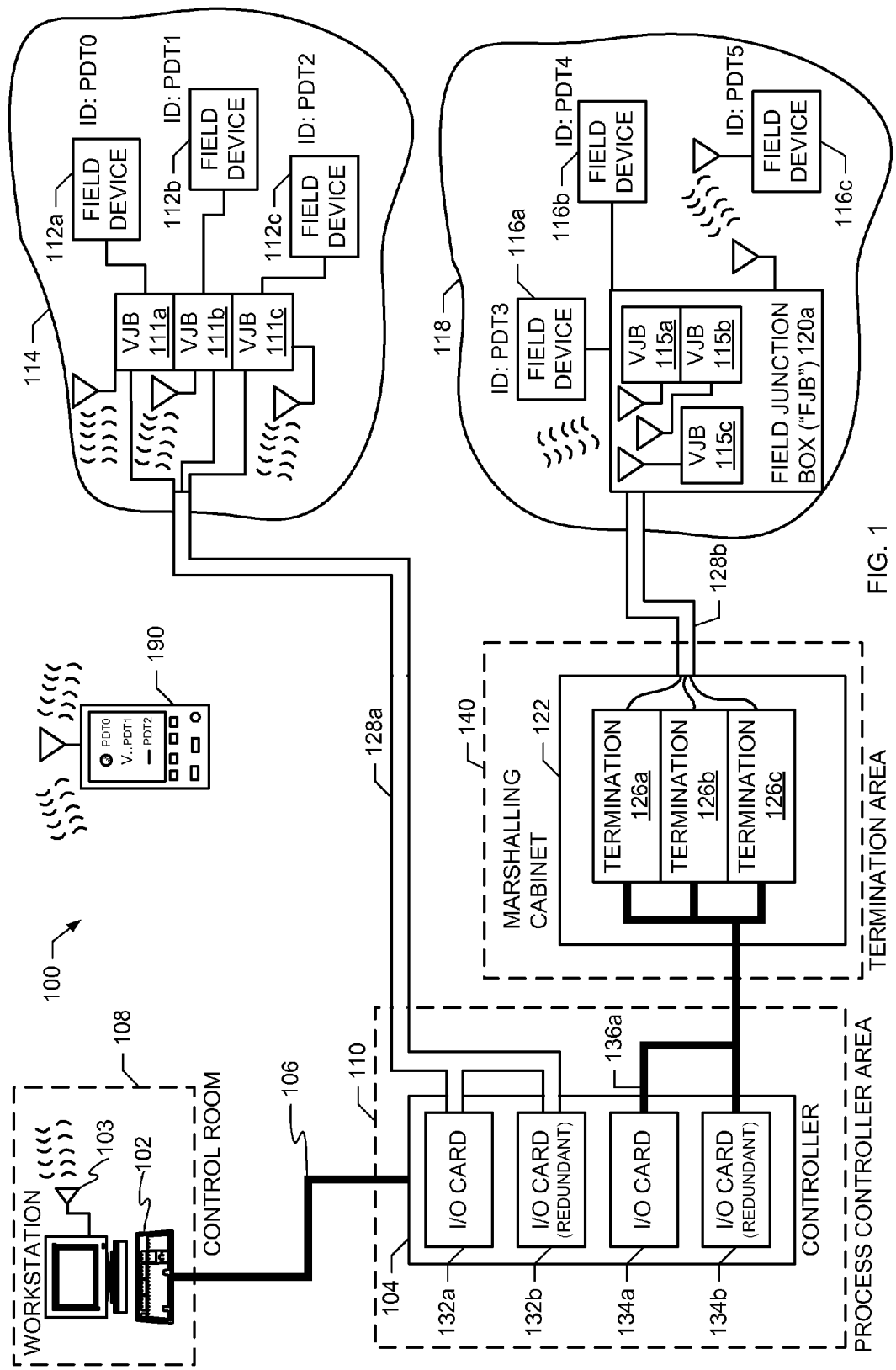
FIG. 1 is a block diagram illustrating an example process control system.

An example process control system includes a control room (e.g., a control room 108 of FIG. 1), a process controller area (e.g. a process controller area 110 of FIG. 1), VJBs (e.g., VJBs 111a-c and 115a-c of FIG. 1), and one or more process areas (e.g., process areas 114 and 118 of FIG. 1). A process area includes a plurality of field devices that perform operations (e.g., controlling valves, controlling motors, controlling boilers, monitoring, measuring parameters, etc.) associated with performing a particular process (e.g., a chemical process, a petroleum process, a pharmaceutical process, a pulp and paper process, etc.). Some process areas are not accessible by humans due to harsh environment conditions (e.g., relatively high temperatures, airborne toxins, unsafe radiation levels, etc.) The control room typically includes one or more workstations within an environment that is safely accessible by humans. The workstations include user applications that users (e.g., engineers, operators, process control personnel, etc.) can access to control operations of the process control system by, for example, changing variable values, process control functions, etc. The process control area includes one or more process controllers communicatively coupled to the workstation(s) in the control room. The process controllers automate control of the field devices in the process area by executing process control strategies implemented via the workstation. An example process strategy involves measuring a pressure using a pressure sensor field device and automatically sending a command to a valve positioner to open or close a flow valve based on the pressure measurement.

Additionally, the process control system includes VJBs communicatively coupled to respective field devices. The VJBs may be located within the same process area as a communicatively coupled field device or adjacent to the process control area. The VJBs route signals from respective field devices to a communicatively coupled I/O card that is communicatively coupled to the process controller. The I/O cards translate information received from the field devices to a format compatible with the controllers and translate information from the controllers to a format compatible with the field devices. In some example implementations, the process control system may include termination areas within a marshalling cabinet that further enables the controllers to communicate with the field devices in the process area. In particular, the marshalling cabinet may include a plurality of termination modules used to marshal, organize, or route signals from the VJBs coupled to the field devices to one or more I/O cards communicatively coupled to the controllers.

In the example methods and systems described herein, the process control system includes an example verification controller (e.g., verification controller 190 of FIG. 1) to verify a communication path between a process controller and a field device. The example verification controller verifies a communication path by sending a command signal to one portion of the process control system and receiving a reception signal from a second portion of the process control system. For example, the verification controller may send a command signal to an example VJB coupled to a field device. The verification controller may also send an instruction to the process controller indicating which I/O card to monitor for a verification signal. In response to receiving the command signal, the VJB transmits a verification signal to a communicatively coupled I/O card. The I/O card forwards the verification signal to a coupled process controller. The process controller then sends a reception signal to the verification controller. The verification signal may include an identifier of the I/O card that received the verification signal. Upon receiving the reception signal, the verification controller compares the identifier of the I/O card that received the verification signal to the specified I/O card. If the I/O card identifiers match, the communication path is classified as verified.

However, if the verification controller does not receive a reception signal from the process controller, the verification controller may retransmit command signals and instruct the process controller to monitor other I/O cards, I/O channels, and/or I/O slots until the verification signal is located. The verification controller then indicates to the process control personnel which I/O card is incorrectly communicatively coupled to the VJB and/or the field device. This enables the process control personnel to go directly to the trouble area and to correct the issue. If the verification controller still does not receive a reception signal, the verification controller may instruct the VJB to reverse the polarity of the verification signal or the verification controller may change the direction of the verification signal by transmitting a command signal to the process controller, which then transmits the verification signal via a communication path to the VJB. If the verification controller still has not received a reception signal, the verification controller may indicate that the communication path between the VJB and the process controller is not connected.

The verification controller may be an electronic device that communicates wirelessly with the process control system. The electronic device may include a handheld process control processor specifically designed for process control I/O verification. Alternatively, the electronic device may include a laptop, a personal digital assistant (PDA), and/or a cellular phone that includes an I/O verification application. In other examples, the verification controller may be wired into the process control system and displayed within a workstation. The verification controller may communicate directly with the process controller or, alternatively, the process controllers may communicate with the verification controller through a workstation that includes a connection to the verification controller.

Techniques used to communicatively couple field devices within a process control system to controllers include using a separate bus (e.g., a wire, a cable, or a circuit) between each field device and a respective I/O card communicatively coupled to a controller (e.g., a process controller, a programmable logic controller, etc.). An I/O card enables communicatively coupling a controller to a plurality of field devices associated with different data types or signal types (e.g., analog in (AI) data types, analog out (AO) data types, discrete in (DI) data types, discrete out (DO) data types, digital in data types, and digital out data types)) and different field device communication protocols by translating or converting information communicated between the controller and the field devices. Multiple I/O slots and/or I/O channels on a single I/O card enables an I/O card to be communicatively coupled to multiple field devices.

For example, an I/O card may be provided with one or more field device interfaces configured to exchange information with a field device using the field device communication protocol associated with that field device. Different field device interfaces communicate via different channel types (e.g., AI channel types, AO channel types, DI channel types, DO channel types, digital in channel types, and digital out channel types). In addition, the I/O card can convert information (e.g., voltage levels) received from the field device into information (e.g., pressure measurement values) that the controller can use to perform operations associated with controlling the field device. This technique requires a bundle of wires or buses (e.g., a multi-core cable) to communicatively couple a plurality of field devices to I/O cards.

A separate bus may be used to communicatively couple each field device to an I/O card or, alternatively, field devices may be communicatively coupled to an I/O card by terminating a plurality of field devices at a termination panel (e.g., a marshalling cabinet) and using one bus (e.g., a conductive communication medium, an optical communication medium, a wireless communication medium) communicatively coupled between the termination panel and the I/O card to communicatively couple the field devices to the I/O card. In other examples, an I/O card with a single I/O slot may only be coupled to a single field device.

An example universal I/O bus (e.g., a common or shared communication bus) may be used to communicatively couple one or more termination modules to one or more I/O cards communicatively coupled to a controller. Each termination module is communicatively coupled to one or more respective VJBs that are communicatively coupled to respective field devices using a respective field device bus (e.g., an analog bus or a digital bus). The VJBs are configured to receive field device information from the field devices and forward the field device information to respective termination modules via the field device buses and communicate the field device information to the I/O cards via the universal I/O bus by, for example, packetizing the field device information and communicating the packetized information to the I/O cards via the universal I/O bus. Alternatively, the VJBs may be communicatively coupled directly to respective I/O cards and forward field device information to the I/O card.

The field device information may include, for example, field device identification information (e.g., device tags, electronic serial numbers, etc.), field device status information (e.g., communication status, diagnostic health information (open loop, short, etc.)), field device activity information (e.g., process variable (PV) values), field device description information (e.g., field device type or function such as, for example, valve actuator, temperature sensor, pressure sensor, flow sensor, etc.), field device connection configuration information (e.g., multi-drop bus connection, point-to-point connection, etc.), field device bus or segment identification information (e.g., field device bus or field device segment via which field device and/or VJB is communicatively coupled to termination module), and/or field device data type information (e.g., a data type descriptor indicative of the data type used by a particular field device). The I/O card(s) can extract the field device information received via the universal I/O bus and communicate the field device information to the controller, which can then communicate some or all of the information to one or more workstation terminals for subsequent analysis.

To communicate field device information (e.g., commands, instructions, queries, threshold activity values (e.g., threshold PV values), etc.) from workstation terminals to field devices, I/O cards can packetize the field device information and communicate the packetized field device information to a plurality of VJBs. Each of the VJBs can then extract or depacketize respective field device information from the packetized communications received from a respective I/O card and communicate the field device information to a respective field device.

In FIG. 1, an example process control system 100 includes a workstation 102 communicatively coupled to a process controller 104 via a bus or local area network (LAN) 106, which is commonly referred to as an application control network (ACN). The LAN 106 may be implemented using any desired communication medium and protocol. For example, the LAN 106 may be based on a hardwired or wireless Ethernet communication protocol. However, any other suitable wired or wireless communication medium and protocol could be used. The workstation 102 may be configured to perform operations associated with one or more information technology applications, user-interactive applications, and/or communication applications. For example, the workstation 102 may be configured to perform operations associated with process control-related applications and communication applications that enable the workstation 102 and the process controller 104 to communicate with other devices or systems using any desired communication media (e.g., wireless, hardwired, etc.) and protocols (e.g., HTTP, SOAP, etc.).

Additionally, the workstation 102 includes a transceiver 103 to enable wireless communication between an example verification controller 190 and the workstation 102 and/or any process controller 104 coupled to the workstation 102. The transceiver 103 may be a wireless transceiver that communicates with the verification controller via a wireless communication medium (e.g., wireless Ethernet, IEEE-802.11, Wi-Fi®, Bluetooth®, etc.).

The process controller 104 may be configured to perform one or more process control routines or functions that have been generated by a system engineer or other system operator using, for example, the workstation 102 or any other workstation and which have been downloaded to and instantiated in the process controller 104. In the illustrated example, the workstation 102 is located in a control room 108 and the process controller 104 is located in a process controller area 110 separate from the control room 108.

In the illustrated example, the example process control system 100 includes field devices 112a-c in a first process area 114 and field devices 116a-c in a second process control area 118. The example process control system 100 shows that VJBs 111a-c may be directly communicatively coupled to I/O cards 132a-b or, alternatively, VJBs 115a-c may be communicatively coupled to a field junction box (FJB) 120a that is coupled to termination modules 126a-c within a marshalling cabinet 122. The example methods described herein will work with either connection setup or configuration. The FJB 120a routes signals from the VJBs 115a-c coupled to respective field devices 116a-c to the marshalling cabinet 122. The marshalling cabinet 122, in turn, marshals (e.g., organizes, groups, etc) information received from the VJBs 115a-c and routes the field device information to respective I/O cards (e.g., I/O cards 134a-b) of the process controller 104.

In the illustrated example, the communications between the process controller 104 and the field devices 116a-c are bidirectional so that the marshalling cabinet 122 is also used to route information received from I/O cards 134a-b of the process controller 104 to respective ones of the field devices 116a-c via the field junction box 120a. Furthermore, the process area 114 is directly communicatively coupled to the I/O cards 132a-b without an intermediate FJB and/or marshalling cabinet. As a result, the field devices 112a-c are communicatively coupled to the respective VJBs 111a-c and the VJBs 111a-c are communicatively coupled directly to the I/O cards 132a-b. The field devices 112a-c and 116a-c may be communicatively coupled to respective ones of the VJBs 111a-c and 115a-c via electrically conductive, wireless, and/or optical communication media. For example, the VJBs 115a-115b may be provided with one or more electrical, wireless, and/or optical data transceivers to communicate with electrical, wireless, and/or optical transceivers of the field devices 116a-c. In the illustrated example, the field junction box 120a is communicatively coupled wirelessly to the field device 116c.

The field devices 112a-c and 116a-c may be Fieldbus compliant valves, actuators, sensors, etc., in which case the field devices 112a-c and 116a-c communicate via a digital data bus using the well-known Fieldbus communication protocol. Of course, other types of field devices and communication protocols could be used instead. For example, the field devices 112a-c and 116a-c could instead be Profibus, HART, or AS-i compliant devices that communicate via the data bus using the well-known Profibus and HART communication protocols. In some example implementations, the field devices 112a-c and 116a-c can communicate information using analog communications or discrete communications instead of digital communications. In addition, the communication protocols can be used to communicate information associated with different data types.

Each of the field devices 112a-c and 116a-c is configured to store field device identification information. The field device identification information may be a physical device tag (PDT) value, a device tag name, an electronic serial number, etc. that uniquely identifies each of the field devices 112a-c and 116a-c. In the illustrated example of FIG. 1, the field devices 112a-c store field device identification information in the form of physical device tag values PDT0-PDT2 and the field devices 116a-c store field device identification information in the form of physical device tag values PDT3-PDT5. The field device identification information may be stored or programmed in the field devices 112a-c and 116a-c by a field device manufacturer and/or by an operator or engineer involved in installation of the field devices 112a-c and 116a-c. In other example implementations, one or more of the field devices 112a-c and 116a-c may not have the capability to store field device identification information. In these examples, the operator or engineer involved in installation of the field device 112a-c and 116a-c may store the field device identification information in the respective VJB 111a-c and 115a-c.

To route information associated with the field devices 116a-c in the marshalling cabinet 122, the marshalling cabinet 122 is provided with the plurality of termination modules 126a-c. The termination modules 126a-c are configured to marshal information associated with the field devices 116a-c in the second process area 118. As shown, the termination modules 126a-c are communicatively coupled to the field junction boxes 120a via a multi-conductor cable 128b (e.g., a multi-bus cable). In an alternative example implementation in which the marshalling cabinet 122 is omitted, the termination modules 126a-c can be installed in the field junction box 120a.

The illustrated example of FIG. 1 depicts a point-to-point configuration in which each conductor or conductor pair (e.g., bus, twisted pair communication medium, two-wire communication medium, etc.) in the multi-conductor cables 128a-b communicates information uniquely associated with a respective one of the field devices 112a-c and 116a-c via respective ones of the VJBs 111a-c and 115a-c. In an alternative example implementation using a multi-drop wiring configuration, each of the termination modules 126a-c can be communicatively coupled with one or more VJBs. For example, in a multi-drop configuration, the termination module 126a can be communicatively coupled to the VJB 115a and to another VJB (not shown) via a first conductor. In some example implementations, a termination module can be configured to communicate wirelessly with a plurality of field devices using a wireless mesh network.

Each of the termination modules 126a-c may be configured to communicate with a respective one of the field devices 116a-c using a different data type. For example, the termination module 126a may include a digital field device interface to communicate with the field device 116a using digital data while the termination module 126b may include an analog field device interface to communicate with the field device 116b using analog data.

To control I/O communications between the process controller 104 (and/or the workstation 102) and the field devices 112a-c and 116a-c, the process controller 104 is provided with the plurality of I/O cards 132a-b and 134a-b. In the illustrated example, the I/O cards 132a-b are configured to control I/O communications between the process controller 104 (and/or the workstation 102) and the field devices 112a-c in the first process area 114, and the I/O cards 134a-b are configured to control I/O communications between the process controller 104 (and/or the workstation 102) and the field devices 116a-c in the second process area 118.

In the illustrated example of FIG. 1, the I/O cards 132a-b and 134a-b reside in the process controller 104. To communicate information from the field devices 112a-c and 116a-c to the workstation 102, the I/O cards, 132a-b and 134a-b communicate the information to the process controller 104 and the process controller 104 communicates the information to the workstation 102. Similarly, to communicate information from the workstation 102 to the field devices 112a-c and 116a-c, the workstation 102 communicates the information to the process controller 104. The process controller 104 then communicates the information to the I/O cards 132a-b and 134a-b. The I/O cards 132a-b communicate the information to the field devices 112a-c via the VJBs 111a-c while the I/O cards 134a-b communicate the information to the field devices 116a-c via the termination modules 126a-c and the VJBs 115a-c.

To provide fault tolerant operations in the event that either of the I/O cards 132a and 134a fails, the I/O cards 132b and 134b are configured as redundant I/O cards. That is, if the I/O card 132a fails, the redundant I/O card 132b assumes control and performs the same operations as the I/O card 132a would otherwise perform. Similarly, the redundant I/O card 134b assumes control when the I/O card 134a fails.

To enable communications between the termination modules 126a-c and the I/O cards 134a-b, the termination modules 126a-c are communicatively coupled to the I/O cards 134a-b via a first universal I/O bus 136a. Unlike the multi-conductor cables 128a-b, which uses separate conductors or communication mediums for each one of the field devices 112a-c and 116a-c, the universal I/O bus 136a is configured to communicate information corresponding to a plurality of field devices (e.g., the field devices 116a-c) using the same communication medium. For example, the communication medium may be a serial bus, a two-wire communication medium (e.g., twisted-pair), an optical fiber, a parallel bus, etc. via which information associated with two or more field devices can be communicated using, for example, packet-based communication techniques, multiplexing communication techniques, etc.

FIG. 1 shows that the process control system 100 may be configured such that VJBs may forward field device information directly to I/O cards or the VJBs may pass field device information to a FJB and/or termination modules. In the illustrated example of FIG. 1, the VJBs 111a-c receive field device information from the respective field devices 112a-c and forward the field device information to the I/O cards 132a-b via the multi-conductor cable 128a. The VJBs 115a-c forward field device information from the respective field devices 116a-c through the FJB 120a to the respective termination modules 126a-c in the marshalling cabinet 122 via the multi-conductor cable 128b. The termination modules 126a-c convert the field device information into a digital packet-based protocol to communicate with the I/O cards 134a-b via the universal I/O bus 136a.

In an example implementation, the universal I/O bus 136a is implemented using the RS-485 serial communication standard. The RS-485 serial communication standard can be configured to use less communication control overhead (e.g., less header information) than other known communication standards (e.g., Ethernet). However, in other example implementations, the universal I/O bus 136a can be implemented using any other suitable communication standard including Ethernet, universal serial bus (USB), IEEE 1394, etc. In addition, although the universal I/O bus 136a is described above as a wired communication medium, in another example implementation, the universal I/O bus 136a can be implemented using a wireless communication medium (e.g., wireless Ethernet, IEEE-802.11, Wi-Fi®, Bluetooth®, etc.).

In the illustrated example, the I/O bus 136a is configured to communicate information between the I/O cards 134a-b and the termination modules 126a-c. The I/O cards 134a-b and the termination modules 126a-c use an addressing scheme to enable the I/O cards 134a-b to identify which information corresponds to which one of the termination modules 126a-c and to enable each of the termination modules 126a-c to determine which information corresponds to which of the field devices 116a-c. When the termination module 126a-c is connected to one of the I/O cards 134a-b, that I/O card automatically obtains an address of the termination module (from, for example, the termination module) to exchange information with the termination module. In this manner, the termination modules 126a-c can be communicatively coupled anywhere on the respective bus 136a without having to manually supply the termination module addresses to the I/O cards 134a-b and without having to individually wire each of the termination modules 126a-c to the I/O cards 134a-b.

The example process control system 100 of FIG. 1 includes the verification controller 190 to verify communication paths between the VJBs 111a-c and 115a-c and the process controller 104. The communication paths include the universal I/O bus 136a, the multi-conductor cables 128a-b, the I/O cards 132a-b and 134a-b, the termination modules 126a-126c, the FJB 120a, and/or any other communication medium or device connecting a VJB to the process controller 104.

The verification controller 190 may be an electronic device that communicates wirelessly with the process control system 100. The electronic device may include a handheld process control processor specifically designed for process control I/O verification. Alternatively, the electronic device may include a laptop, a personal digital assistant (PDA), and/or a cellular phone that includes an I/O verification application. In other examples, the verification controller 190 may be wired into the process control system 100 and displayed within the workstation 102.

The example VJBs 111a-c and 115a-c of FIG. 1 are junction boxes that communicatively couple field devices 112a-c and 116a-c to the process controller 104. The VJBs 111a-c and 115a-c may be installed in close proximity to the respective field devices 112a-c and 116a-c. Alternatively, the VJBs 111a-c and 115a-c may be installed within any area of the process control system 100 between the communication path of the field devices 112a-c and 116a-c and the process controller 104. This may include within the marshalling cabinet 122, within the FJB 120a, and/or within the process controller area 110. The example VJBs 111a-c and 115a-c facilitate migrating existing process control system installations to a configuration substantially similar to the configuration of the example process control system 100 of FIG. 1 and can be configured to be communicatively coupled to existing field devices 112*a-c* and 116*a-c* already installed in a process control system.

The example VJBs 111*a-c* and 115*a-c* include transceivers for communicating with the verification controller 190. The example of FIG. 1 shows the VJBs 111*a-c* and 115*a-c* with wireless transceivers similar to the transceiver 103. In other examples, the VJBs 111*a-c* and 115*a-c* may be wired to the verification controller 190. The example VJBs 111*a-c* and 115*a-c* may include an electronic identification number used to identify each VJB 111*a-c* and 115*a-c*. Additionally, each VJB 111*a-c* and 115*a-c* may acquire the identification information (e.g., PDT value) from the respective field devices 112*a-c* and 116*a-c*. The VJB identification information is included in a verification signal and/or a command signal transmitted by each VJB 111*a-c* and 115*a-c*, which is used by the verification controller 190 to verify the communication path. Additionally, the identification information may be used by each VJB 111*a-c* and 115*a-c* to determine to which command signals to respond. For example, the VJB 111*a* may only respond to command signals that include the identification information of the VJB 111*a*.

Upon receiving a verification signal and/or a command signal, the VJBs 111*a-c* and 115*a-c* may transmit a protocol signal to the respective field devices 112*a-c* and 116*a-c* to verify the field devices 112*a-c* and 116*a-c* are correctly communicatively coupled to the respective VJBs 111*a-c* and 115*a-c*. However, in some process control systems, the VJBs 111*a-c* and 115*a-c* can be installed in close proximity to the respective field devices 112*a-c* and 116*a-c*. In these cases, the VJBs 111*a-c* and 115*a-c* may not be required to send a protocol signal to verify proper connectivity to the field devices 112*a-c* and 116*a-c*. In other examples, the VJBs 111*a-c* and 115*a-c* may verify a communication path to the process controller 104 before the respective field devices 112*a-c* and 116*a-c* are communicatively coupled to the VJBs 111*a-c* and 116*a-c*.

To verify a communication path between the example VJBs 111*a-c* and 115*a-c* and the process controller 104, the example verification controller 190 sends a command signal to either the transceiver 103 or a transceiver within one of the VJBs 111*a-c* and 115*a-c* depending on the type of field device 112*a-c* and 116*a-c* connected to the VJB 111*a-c* and 115*a-c*. For example, if the field device 112*a* is an input field device (e.g., a device that measures a process and sends a signal to the process controller 104), the verification controller 190 sends the command signal to the VJB 111*a* communicatively coupled to the field device 112*a*. However, if the field device 112*a* is an output field device (e.g., a device that performs an action based on a command from the process controller 104), the verification controller 190 sends the command signal to the transceiver 103. The transceiver 103 may be implemented using a transmitter amplifier and a receiver amplifier that conditions signals exchanged between the verification controller 190 and the workstation 102 and/or the process controller 104. In other examples, the transceiver 103 may be included within and directly communicatively coupled to the process controller 104.

The verification controller 190 is programmed with information regarding each of the field devices 112*a-c* and 116*a-c* including, for example, device type (e.g., input or output), device identification information, device signal type (e.g., analog, discrete, digital), location in the process control system 100, and/or to which I/O card the field device is specified to be connected. Additionally, the verification controller 190 may be programmed with VJB identifier information specifying which VJB is connected to which field device. The programming of the verification controller 190 may be performed by an operator of the process control system 100 and/or maybe defined from design documents or product specifications describing the process control system 100.

The command signal transmitted from the verification controller 190 may include an identifier of the VJB 111*a-c* and 115*a-c*, an identifier of the field device 112*a-c* and 116*a-c*, and/or an identifier of the I/O card 132*a-b* and 134*a-b*. For example, the verification controller 190 may wirelessly transmit a command signal including an identifier of the VJB 111*a*. All of the VJBs 111*a-c* and 115*a-c* may receive the wireless signal, however only the VJB 111*a* will transmit a verification signal. In a similar manner, the verification controller 190 may transmit a command signal with an identifier corresponding to the I/O card 132*a-b*. In response to receiving the command signal, the process controller 104 transmits a verification signal though the I/O card 132*a-b*.

In cases when the verification controller 190 transmits the command signal to a VJB, the verification controller 190 may also transmit an instruction to the process controller 104 indicating which I/O card to monitor for a verification signal. For example, if the verification controller 190 sends a command signal to the VJB 111*a*, which is specified to be communicatively coupled to I/O card 132*a-b*, the verification controller 190 sends an instruction to the process controller 104 to monitor I/O card 132*a-b* for the verification signal. In other examples, the process controller 104 may monitor all I/O cards for a verification signal. Additionally, the verification controller 190 may specify to the process controller 104 an I/O slot and/or and I/O channel within an I/O card for transmitting a verification signal through or for monitoring for a verification signal.

In response to receiving the command signal, the VJBs 111*a-c* and 115*a-c* transmit a verification signal to a communicatively coupled I/O card 132*a-b* and 134*a-b*. The verification signal may be in the same signal type as the field device (e.g., analog, discrete, digital, etc.) and/or may be any other type of process control protocol based signal. The VJBs 111*a-c* transmit the verification signal directly to the I/O cards 132*a-b* via the multi-conductor cable 128*a* while the VJBs 115*a-c* transmit the verification signal to the FJB 120*a*, which forwards the verification signal via the multi-conductor cable 128*b* to the termination modules 126*a-c*. The termination modules 126*a-c* convert the verification signal to a packetized digital format and transmit the converted verification signal to the I/O card 134*a-b*. Both I/O cards 132*a-b* and 134*a-b* then forward the verification signal to the process controller 104. In a similar manner, a verification signal transmitted by the process controller 104 propagates through the process control system 100 to the VJBs 111*a-c* and 115*a-c*.

In response to receiving a verification signal, the VJBs 111*a-c* and 115*a-c* transmit a reception signal to the verification controller 190. The reception signal may include the identification information of the VJB 111*a-c* and 115*a-c* transmitting the reception signal. Likewise, upon receiving a verification signal, the process controller 104 transmits a reception signal. The reception signal may include the identification information of the I/O card 132*a-b* and 134*a-b* that received the verification signal. The reception signal may be transmitted from the VJBs 111*a-c* and 115*a-c* and/or the process controller 104 wirelessly via transceivers (e.g., the transceiver 103) to the verification controller 190.

In response to receiving a reception signal, the example verification controller 190 matches the received reception signal to the previously transmitted command signal. The verification controller 190 then determines if an identifier of the VJB 111a-c and 115a-c cross-references to an identifier of the I/O card 132a-b and 134a-b. If the identifiers cross-reference, the verification controller 190 indicates the communication path is verified. Additionally, upon verifying the communication path, the VJB 111a-c and 115a-c may be disabled enabling direct communication between the I/O card 132a-b and 134a-b and the respective field device 112a-c and 116a-c. If the identifiers do not cross reference, the verification controller 190 indicates the communication path is wired incorrectly and indicates which VJB is incorrectly wired to which I/O card.

For example, the verification controller 190 transmits a command signal to the VJB 111a and receives a reception signal from the process controller 104 with an identifier of the I/O card 132a. The verification controller 190 cross-references the identifier of the VJB 111a to the identifier of the I/O card 132a and determines the two identifiers are specified to be communicatively coupled. In another example, the verification controller 190 transmits a command signal to the VJB 111a and receives a reception signal from the process controller 104 with an identifier of the I/O card 134a. The verification controller 190 cross-references the identifier of the VJB 111a to the identifier of the I/O card 134a and determines the two identifiers are not specified to be communicatively coupled. As a result, the verification controller 190 indicates an improper connection and displays the VJB 111a communicatively coupled to the I/O card 134a. Process control personnel may then go directly to the I/O card 134a and change the wired connection to the I/O card 132a.

The example verification controller 190 of FIG. 1 includes functionality for determining how a communication path may be incorrectly wired. For example, if the verification controller 190 does not receive a reception signal after sending a command signal, the verification controller 190 can instruct the process controller 104 to monitor other I/O cards and/or I/O channels, can send the command signal to other VJBs while instructing the process controller 104 to monitor the same I/O card, can instruct the VJBs 111a-c and 15a-c and/or the process controller 104 to reverse the polarity of the verification signal, and/or can change the type of the field device (e.g., input or output device) and reverse the direction of the signal propagation through the process control system 100. For example, the verification controller 190 may reverse the signal for an input field device (to test if the device is actually an output device) by sending a command signal to the process controller 104 instead of the VJBs 111a-c and 115a-c. Upon determining how a communication path is incorrectly wired, the verification controller 190 indicates the specified communication path, the current incorrectly wired communication path, and the difference between the specified communication path and the incorrectly wired communication path.

Figure 2:
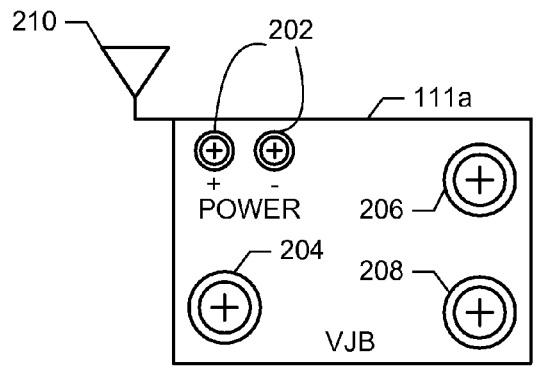
FIG. 2 is a diagram of the example verification junction box of FIG. 1.

FIG. 2 is a diagram of the example VJB 111a of FIG. 1. The example VJB 111a is representative of the VJBs 111b-c and 115a-c of FIG. 1. The example VJB 111a is shown to communicatively couple to a single field device (e.g., the field device 112a) and includes power terminals 202, a first terminal 204, a second terminal 206, a third terminal 208, and a transceiver 210. The terminals 202-208 may include any type of terminal and/or connector for joining electrical circuits within the VJB 111a to exterior electrical circuits and/or communication paths. For example, the terminals 202-208 may include screw terminals, splices, solder lugs, tongue crimps, turrets, pogo terminals, clips, tab terminals, and/or banana terminals (e.g., tip terminals). In other examples, the VJB 111a may include additional terminals for connecting to two or more field devices and/or a second transceiver for communicating with a wireless field device.

The example VJB 111a of FIG. 2 is a junction box for communicatively coupling a field device to the process controller 104. The VJB 111a may be installed in close proximity to the respective field device 112a or, alternatively, the VJB 111a may be installed within any area of the process control system 100 of FIG. 1 between the communication path of the field device 112a and the process controller 104.

Electrical power to the circuitry within the VJB 111a and the transceiver 210 is provided through the power terminals 202 that connect to a power supply. In the illustrated example, the VJB 111a uses the electrical power from the power supply to power communication channels or communication interfaces used to communicate with a field device (e.g., the field device 112a of FIG. 1) and/or to provide the field device electrical power for operation.

To communicatively couple to the process controller 104, the VJB 111a includes the example first terminal 204. The first terminal 204 communicatively couples to the multi-conductor cable 128a of FIG. 1 for coupling directly to the I/O card 132a-b. In other examples, the first terminal 204 may communicatively couple to the FJB and/or the termination module via a multi-conductor cable or, alternatively, may communicatively couple to an I/O card using a universal I/O bus (e.g., the universal I/O bus 136a).

To communicatively couple the example VJB 111a to the field device 112a, the VJB 111a includes the second terminal 206 and the third terminal 208. In the example of FIG. 2, the second terminal 206 couples to the electrically positive side of the field device 112a while the third terminal 208 couples to the electrically negative side (e.g., ground) of the field device 112a. The terminals 206 and 208 enable analog, discrete, and/or digital communications between the VJB 111a and the field device 112a. Additionally, the VJB 111a may provide power to the field device 112a through the terminals 206 and 208.

The VJB 111a enables pass through communication between the I/O card 132a and the field device 112a. For example, when the process control system is in a normal operating mode, the VJB 111a acts as a junction box and directly links the field device 112a to the I/O card 132a. In cases where the I/O card 132a and the field device 112a are based on two-wire communications, the positive terminal of the I/O card is connected to the first terminal 204, which is internally coupled to the second terminal 206 enabling the pass through of an electrical signal. The negative terminal from the I/O card 132a is directly coupled to the negative of the field device 112a at the third terminal 208. This configuration creates a common ground plane between the field device 112a, the VJB 111a, and the I/O card 132a.

In examples when the field device 112a is a single-wire device, the VJB 111a may connect to the field device 112a through the second terminal 206. In other examples, when the field device 112a is configured for three or more communication wires, the VJB 111a may include additional terminals.

To verify the communication path between the field device 112a and the process controller 104, the example VJB 111a of FIG. 2 may electrically isolate the field device 112a from the I/O card 132a. The electrical isolation may be controlled by a relay or a microcontroller. The isolation enables the VJB 111a to transmit a verification signal or receive a verification signal without affecting the operation of the field device 112a. For example, in response to receiving a command signal, the VJB 111a may send a protocol signal via a communication path coupled to the second terminal 206 to the field device 112a to verify the field device 112a is correctly communicatively coupled. In response to a signal from the field device 112a, the VJB 111a may then transmit a verification signal to the I/O card 132a via the communication path 128a. The verification signal may be a different protocol from the protocol signal sent to the field device 112a. Isolating these signals ensures the field device 112a and/or the I/O card 132a does not become damaged during the verification process.

To communicatively couple to the verification controller 190, the example VJB 111a of FIG. 2 includes the transceiver 210. The example transceiver 210 may include any type of antenna, wireless transmitter, wireless receiver, and/or any wired connection. The example transceiver 210 can be implemented using a wireless communication medium (e.g., wireless Ethernet, IEEE-802.11, Wi-Fi®, Bluetooth®, etc.). In other example implementations, the transceiver 210 may be communicatively coupled to the verification controller 190 via a wired communication path. The wired communication path may operate on any protocol including Ethernet, universal serial bus (USB), IEEE 1394, etc.

Figure 3:
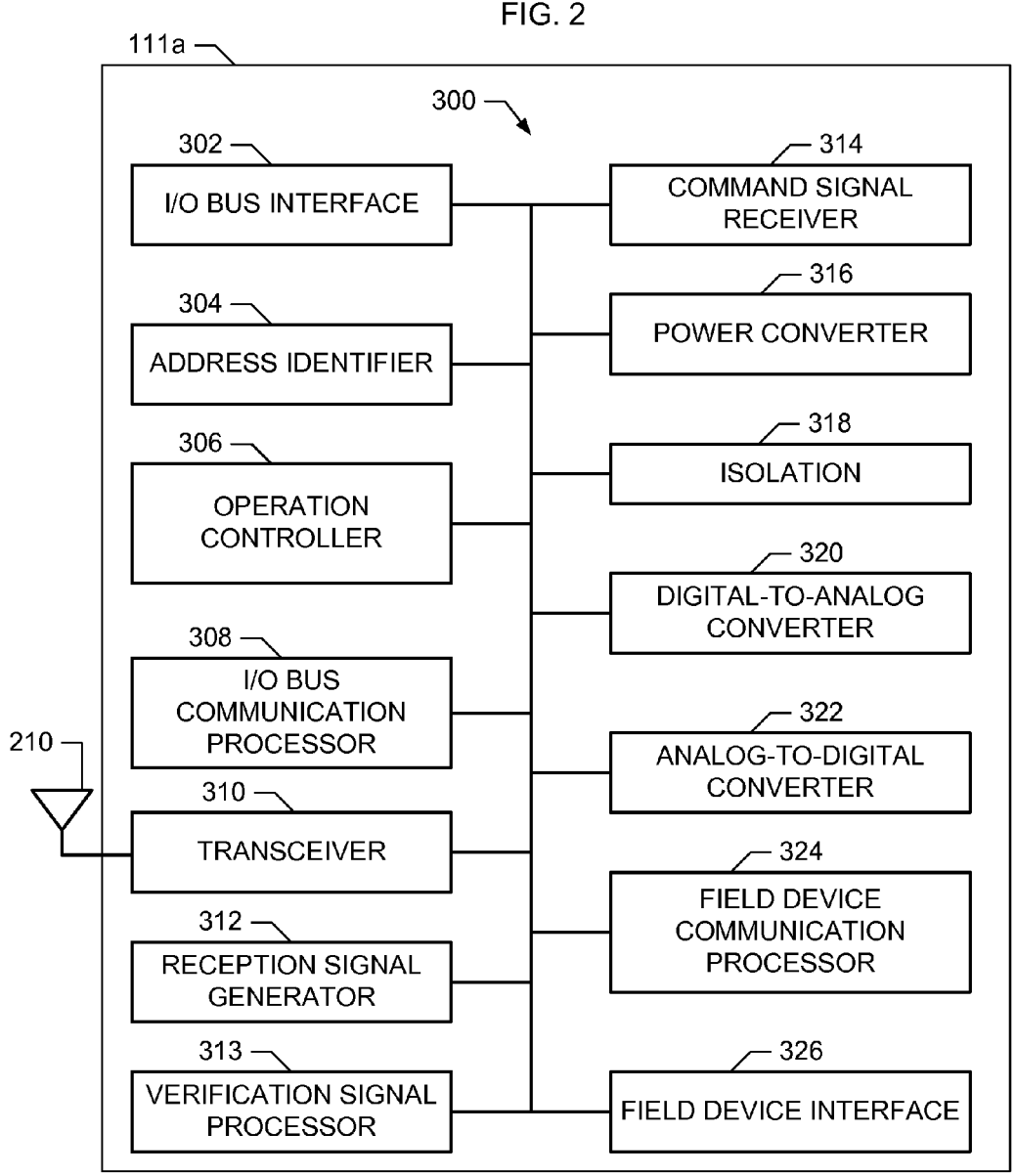
FIG. 3 is a block diagram of the example verification junction box of FIGS. 1 and 2.

FIG. 3 shows a block diagram of the example VJB 111a of FIGS. 1 and 2. The example VJB 111a includes a circuitry block 300 for facilitating verification functionality. To enable communication with the I/O cards 132a-b, the example VJB 111a includes an I/O bus interface 302. The example I/O bus interface 302 may be implemented using, for example, the twisted pair communication medium and/or the two-wire communication medium in the multi-conductor cable 128a of FIG. 1 or, alternatively, the RS-485 serial communication standard, Ethernet in the I/O serial bus interface 136a.

To identify an address of the field device 112a of FIG. 1 and/or an address of the I/O card 132a, the VJB 111a includes an address identifier 304. The address identifier 304 may be configured to query the I/O card 132a for an identifier (e.g., a network address) when the VJB 111a is activated. Similarly, the example address identifier 304 queries the field device 112a for the field device identification information (e.g., the PDT value). Additionally, the example address identifier 304 may store an identifier value assigned to the VJB 111a. In this manner, the VJB 111a uses the I/O card identifier as a source address when transmitting a verification signal and/or communicating information to the I/O card 132a. Similarly, the I/O card 132a uses the VJB identifier and/or the field device identification information as a destination address when forwarding a verification signal and/or communicating information to the VJB 111a. In other examples, the address identifier 304 may store the field device identification information. Process control personnel may store the field device identification information in the address identifier 304 upon communicatively coupling the field device 112a to the VJB 111a.

To control the various operations of the VJB 111a, the VJB 111a includes an operation controller 306. The operation controller 306 can be implemented using a microprocessor, a microcontroller, an application specific integrated circuit (ASIC), a digital signal processor, etc. The operation controller 306 communicates instructions or commands to other portions of the example VJB 111a to control the operations of those portions. For example, in response to the VJB 111a receiving a command signal, the operation controller 306 may instruct a verification signal processor 313 to generate a verification signal and an I/O bus communication processor 308 to transmit the generated verification signal.

The example VJB 111a includes the I/O bus communication processor 308 to exchange information with the I/O card 132a via the multi-conductor cable 128a. In the illustrated example of FIG. 3, the I/O bus communication processor 308 can generate and/or process any analog, discrete, and/or digital signal for communication with the I/O card 132a. Additionally, the example I/O bus communication processor 308 may generate any of the signals types (e.g., analog, discrete, digital, etc.) according to any process control or proprietary protocols. For example, for a digital signal, the I/O bus communication processor 308 packetizes information for transmission to the I/O card 132a and depacketizes information received from the I/O card 132a. Additionally, the I/O bus communication processor 308 generates header information for each packet to be transmitted and reads header information from received packets. Example header information includes a destination address (e.g., the network address of the I/O card 132a), a source address (e.g., the network address of the VJB 111a), a packet type or data type (e.g., analog field device information, field device information, command information, temperature information, real-time data values, etc.), verification information, and/or error checking information (e.g., cyclical-redundancy-check (CRC) information). In some example implementations, the I/O bus communication processor 308 and the operation controller 306 may be implemented using the same microprocessor or microcontroller.

To process data communication with the verification controller 190 of FIG. 1, the example VJB 111a includes a transceiver circuit 310. The example transceiver circuit 310 receives an electrical signal from the transceiver 210 of FIG. 2 and converts the electrical signal into analog, discrete, and/or digital information for processing by the operation controller 306. Additionally, the example transceiver circuit 310 receives and converts analog, discrete, and/or digital information from a reception signal generator 312 into a signal for transmission via the transceiver 210 to the verification controller 190. The transceiver circuit 310 is communicatively coupled to the example transceiver 210 of FIG. 2 and can be implemented using a wireless communication medium (e.g., wireless Ethernet, IEEE-802.11, Wi-Fi®, Bluetooth®, etc.). In other example implementations, the transceiver circuit 310 may be communicatively coupled via the transceiver 210 to the verification controller 190 via a wired communication path. The wired communication path may operate on any protocol including Ethernet, universal serial bus (USB), IEEE 1394, etc.

To generate reception signals, the example VJB 111a includes the example reception signal generator 312. The reception signal generator 312 receives an instruction from the operation controller 306 to generate a reception signal. The operation controller 306 may include the VJB identifier and/or the field device 112a identification information from the address identifier 304 in the instruction to generate a reception signal. In response to the instruction from the operation controller 306, the example reception signal generator 312 generates a reception signal including the VJB identifier and/or the field device 112a identification information. The example reception signal generator 312 forwards the generated reception signal to the transceiver circuit 310 for transmission to the verification controller 190.

To manage the generation and the reception of verification signals, the VJB 111a of FIG. 3 includes the verification signal processor 313. The example verification signal processor 313 generates a verification signal in response to receiving an instruction from the example operation controller 306. The example verification signal processor 313 may access the address identifier 304 and include the VJB identifier and/or the field device identification information within the verification signal. Upon generating a verification signal, the example verification signal processor 313 forwards the verification signal to the I/O bus communication processor 308 for processing and transmission on the multi-conductor cable 128a. Additionally, the example verification signal processor 313 may receive a verification signal from the I/O bus communication processor 308 that was received by the I/O bus interface 302 from the I/O card 132a. In response to receiving a verification signal, the example verification signal processor 313 sends an instruction to generate a reception signal to the operation controller 306.

In some example implementations, the verification signal processor 313 may transit an instruction to a field device communication processor 324 to verify that the field device 112a is communicatively coupled to the VJB 111a. The field device communication processor 324 may send a response signal to the example verification signal processor 313 indicating the status of the field device 112a (e.g., verified or not connected). In response, the example verification signal processor 313 may include the status of the field device 112a in the reception signal command sent to the operation controller 306 or within a generated verification signal sent to the I/O bus communication processor 308.

To receive command signals from the verification controller 190, the example VJB 111a of FIG. 3 includes a command signal receiver 314. The example command signal receiver 314 of FIG. 3 processes a received command signal and sends an instruction to the operation controller 306 to generate a verification signal. For example, the verification controller 190 may generate a wireless command signal received by the example transceiver 310. The transceiver 310 detects a command signal and forwards the command signal to the example command signal receiver 314. The example command signal receiver 314 accesses the address identifier 304 and determines if an identifier within the command signal includes the VJB identifier and/or the field device 112a identification information. If the identifier in the command signal matches either the VJB identifier or the field device 112a identification information, the example command signal receiver 314 sends an instruction for the operation controller 306 to generate a verification signal. The operation controller 306 then instructs the verification signal processor 313 to generate a verification signal. However, if the identifier in the command signal does not match either the VJB identifier or the field device 112a identification information, the example command signal receiver 314 discards the command signal.

To control the amount of power provided to the field device 112a of FIG. 1 (or any other field device), the VJB 111a includes a field power converter 316. In the illustrated example, the power terminals 202 of FIG. 2 provide electrical power to the VJB 111a to power a communication channel interface to communicate with the field device 112a. For example, some field devices communicate using 12 volts and others communicate using 24 volts. In the illustrated example, the field power converter 316 is configured to condition, regulate, and step up and/or step down the electrical power provided to the VJB 111a by the power terminals 202. In some example implementations, the field power converter 316 is configured to limit the amount of electrical power used to communicate with the field devices and/or delivered to the field devices to substantially reduce or eliminate the risk of sparking in flammable or combustible environments.

Additionally, the example field power converter 316 converts electrical power received from the power terminals 202 to electrical power for the VJB 111a and/or the field device 112a. In the illustrated example, the circuitry used to implement the VJB 111a uses one or more voltage levels (e.g., 3.3 V) that are different from the voltage levels required by the field device 112a. The example field power converter 316 is configured to provide the different voltage levels for the VJB 111a and the field device 112a using the power received through the power terminals 202. In the illustrated example, the electrical power outputs generated by the field power converter 316 are used to power the VJB 111a and the field device 112a and to communicate information between the VJB 111a and the field device 112a. Additionally, the example field power converter 316 is used to power the transceiver circuit 310 for transmitting a reception signal and to power the I/O bus communication processor 308 for transmitting a verification signal. Some field device communication protocols require relatively higher or lower voltage levels and/or electrical current levels than other communication protocols. In the illustrated example, the field power converter 316 to provides the voltage level(s) to power the field device 112a and to communicate with the field device 112a. However, in other example implementations, the electrical power outputs generated by field power converter 316 may be used to power the VJB 111a while a separate power supply is used to power the field device 112a.

To electrically isolate the circuitry of the VJB 111a from the I/O card 132a, the VJB 111a includes one or more isolation devices 318. The isolation devices 318 may be implemented using galvanic isolators and/or optical isolators. By isolating the circuitry block 300 from the power terminals 202, any power variation (e.g., power surges, current spikes, etc.) associated with the field device 112a will not harm the field power converter 316. Also, any power variations in the VJB 111a will not harm or affect the operation of the field device 112a. Additionally, by isolating the circuitry block 300 from the field power converter 316, any power variation (e.g., power surges, current spikes, etc.) associated with the I/O card 132a will not harm the circuitry block 300 and/or the field power converter 316. Also, any power variations the VJB 111a will not harm or affect the operation of the I/O card 132a.

To convert between analog and digital signals, the VJB 111a includes a digital-to-analog converter 320 and an analog-to-digital converter 322. The digital-to-analog converter 320 is configured to convert digitally represented analog values received from the I/O card 132a to analog values that can be communicated to the field device 112a of FIG. 1. The analog-to-digital converter 322 is configured to convert analog values (e.g., measurement values) received from the field device 112a to digitally represented values that can be communicated to the I/O card 132a. In an alternative example implementation in which the VJB 111a is configured to communicate digitally with the field device 112a, the digital-to-analog converter 320 and the analog-to-digital converter 322 can be omitted from the termination module 124a. Additionally, any analog command signal or analog verification signal that is received by the VJB 111a may be converted into a digital signal using the analog-to-digital converter 322 for processing by the operation controller 306.

To control communications with the field device 112a, the VJB 111a includes the field device communication processor 324. The field device communication processor 324 ensures that information received from the I/O card 132a is in the correct format and voltage type (e.g., analog or digital) to be communicated to the field device 112a. The field device communication processor 324 is also configured to packetize or depacketize information if the field device 112a is configured to communicate using digital information. In addition, the field device communication processor 324 is configured to extract information received from the field device 112a and communicate the information to the analog-to-digital converter 322 and/or to the I/O bus communication processor 308 for subsequent communication to the I/O card 132a. In the illustrated example, the field device communication processor 324 is also configured to timestamp information received from the field device 112a. Generating timestamps at the VJB 111a facilitates implementing sequence of events (SOE)

operations using timestamp accuracies in the sub-millisecond range. For example, the timestamps and respective information can be communicated to the process controller 104 and/or the workstation 102. Sequence of events operations performed by, for example, the workstation 102 (FIG. 1) (or any other processor system) can then be used to analyze what happened before, during, and/or after a particular state of operation (e.g., a failure mode) to determine what caused the particular state of operation to occur. Timestamping in the sub-millisecond range enables capturing events using relatively higher granularity. In some example implementations, the field device communication processor 324 and the operation controller 306 can be implemented using the same microprocessor or microcontroller.

In general, field device communication controllers similar to the field device communication controller 324 are provided with communication protocol functions or other communication functions (e.g., Fieldbus communication protocol functions, HART communication protocol functions, etc.) corresponding to the type of field device with which they are configured to communicate. For example, if the field device 112a is implemented using a HART device, the field device communication controller 324 of the VJB 111a is provided with HART communication protocol functions. When the VJB 111a receives information from the I/O card 132a intended for the field device 112a, the field device communication controller 324 formats the information in accordance with the HART communication protocol and delivers the information to the field device 112a.

In the illustrated example of FIG. 3, the field device communication controller 324 is configured to process pass-through messages. Pass-through messages originate at a workstation (e.g., the workstation 102 of FIG. 1) and are communicated as payload (e.g., the data portion of a communication packet) through a controller (e.g., the process controller 104 of FIG. 1) and to a VJB (e.g., the VJB 111a of FIG. 1) for delivery to a field device (e.g., the field device 112a). For example, a message originating at the workstation 102 and intended to be delivered to the field device 112a is tagged at the workstation 102 with a communication protocol descriptor (e.g., a HART protocol descriptor) and/or is formatted in accordance with a communication protocol of the field device 112a. The workstation 102 then wraps the message into a payload(s) of one or more communication packets to deliver the message from the workstation 102, through the I/O process controller 104, and to the VJB 111a as a pass-through message. Wrapping the message involves, for example, packetizing the message within header information in accordance with a communication protocol (e.g., a Fieldbus protocol, a HART protocol, etc.) used to communicate with the field devices. When the VJB 111a receives the communication packet(s) containing the pass-through message from the I/O card 132a, the I/O bus communication processor 308 of FIG. 3 extracts the payload(s) from the received communication packet(s). The field device communication controller 324 of FIG. 3 then unwraps the pass-through message from the payload(s), formats the message in accordance with the communication protocol descriptor generated by the workstation 102 (if not already formatted at the workstation 102), and communicates the message to the field device 112a.

The field device communication controller 324 is also configured to communicate pass-through messages to the workstation 102 in a similar manner. For example, if the field device 112a generates a message (e.g., a response to the workstation message or any other message) intended to be delivered to the workstation 102, the field device communication controller 324 wraps the message from the field device 112a into the payload of one or more communication packets and the I/O bus communication processor 308 communicates the one or more packets containing the wrapped message to the I/O card 132a. When the workstation 102 receives the packets from the process controller 104 containing the wrapped message, the workstation 102 can unwrap and process the message.

The VJB 111a includes a field device interface 326 configured to communicatively couple the VJB 111a to a field device (e.g., the field device 112a of FIG. 1). For example, the field device interface 326 may be communicatively coupled to the terminals 206 and 208 of FIG. 2.

While an example manner of implementing the VJB 111a is depicted in FIG. 3, one or more of the interfaces, data structures, elements, processes and/or devices illustrated in FIG. 3 may be combined, divided, rearranged, omitted, eliminated and/or implemented in any other way. For example, the example I/O bus interface 302, the example address identifier 304, the example operation controller 306, the example I/O bus communication processor 308, the example transceiver circuit 310, the example reception signal generator 312, the example verification signal processor 313, the example command signal receiver 314, the example field power converter 316, the example isolation device 318, the example digital-to-analog converter 320, the example analog-to-digital converter 322, the example field device communication processor 324, and/or the example field device interface 326 illustrated in FIG. 3 may be implemented separately and/or in any combination using, for example, machine-accessible or readable instructions executed by one or more computing devices and/or computing platforms (e.g., the example processing platform 1010 of FIG. 10).

Further, the example I/O bus interface 302, the example address identifier 304, the example operation controller 306, the example I/O bus communication processor 308, the example transceiver circuit 310, the example reception signal generator 312, the example verification signal processor 313, the example command signal receiver 314, the example field power converter 316, the example isolation device 318, the example digital-to-analog converter 320, the example analog-to-digital converter 322, the example field device communication processor 324, the example field device interface 326, and/or more generally, the VJB 111a may be implemented by hardware, software, firmware and/or any combination of hardware, software and/or firmware. Thus, for example, any of the example I/O bus interface 302, the example address identifier 304, the example operation controller 306, the example I/O bus communication processor 308, the example transceiver circuit 310, the example reception signal generator 312, the example verification signal processor 313, the example command signal receiver 314, the example field power converter 316, the example isolation device 318, the example digital-to-analog converter 320, the example analog-to-digital converter 322, the example field device communication processor 324, the example field device interface 326, and/or more generally, the VJB 111a can be implemented by one or more circuit(s), programmable processor(s), application specific integrated circuit(s) (ASIC(s)), programmable logic device(s) (PLD(s)) and/or field programmable logic device(s) (FPLD(s)), etc.

Figure 4:
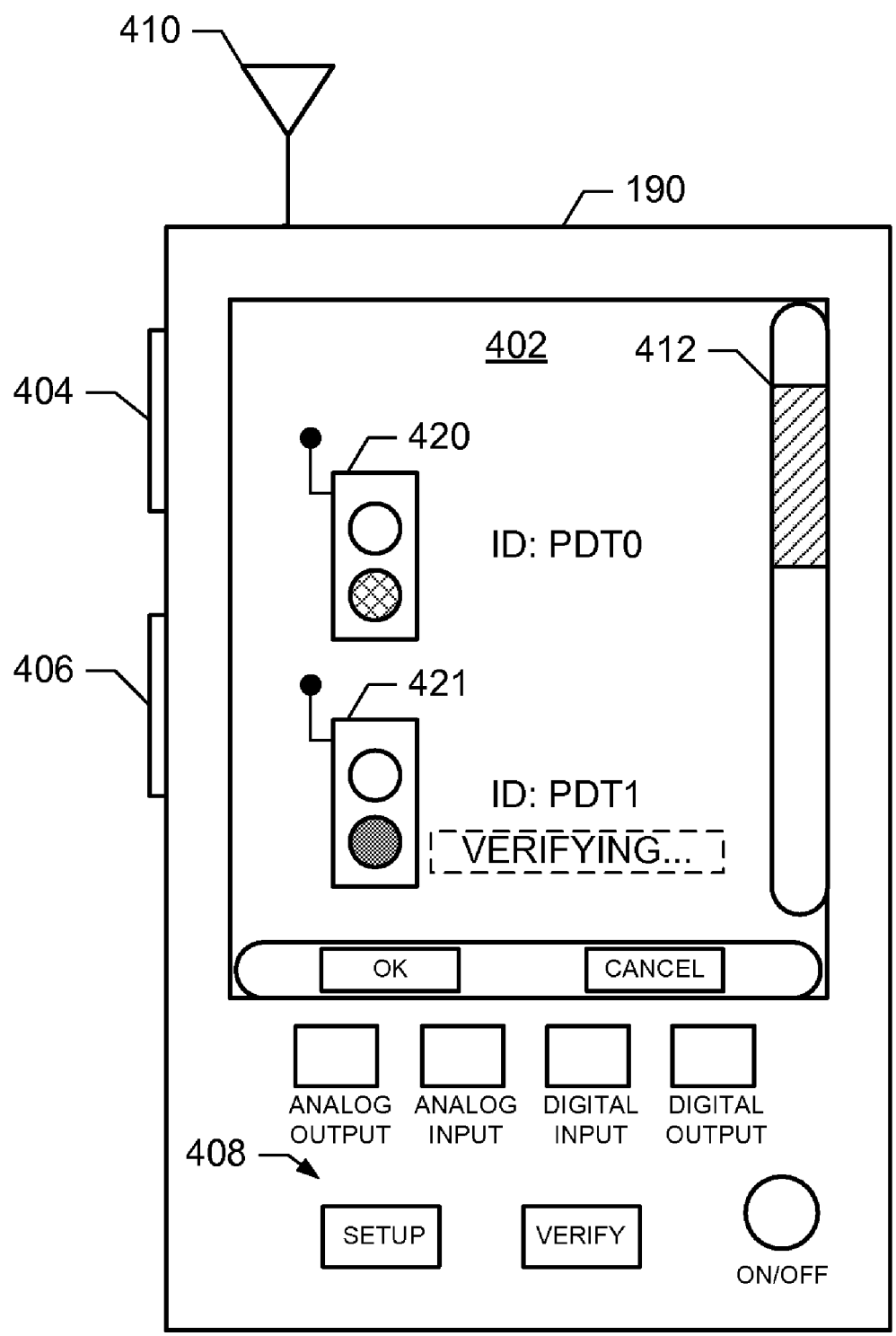
FIG. 4 is a diagram of the example verification controller of FIG. 1.

FIG. 4 is a diagram of the example verification controller 190 of FIG. 1. The example verification controller 190 may be an electronic device that communicates wirelessly with the process control system 100 of FIG. 1. The electronic device may include a handheld process control processor specifically designed for process control I/O verification. Alternatively, the electronic device may include a laptop, a personal digital assistant (PDA), and/or a cellular phone that includes an I/O verification application. In other examples, the example verification controller 190 of FIG. 4 may be wired into the process control system 100 and displayed within the workstation 102. The verification controller may communicate directly with the process controller 104 of FIG. 1 or, alternatively, the process controllers may communicate with the verification controller through a workstation that includes a connection to the verification controller.

The example verification controller 190 includes a display 402, a first function button 404, a second function button 406, a front panel 408, and a transceiver 410. In other examples, the verification controller 190 may include additional function buttons, additional panels, and/or sockets for connecting other types of I/O devices (e.g., a keyboard, a mouse, a trackball, a memory card, etc.).

To display verification information and process control information, the example verification controller 190 includes the display 402. The example display 402 shows a scroll bar 412, a first field device icon 420, and a second field device icon 421. The display 402 may include a touchscreen display such that process control personnel may use a pen or finger to select items within the display 402. Alternatively, process control personnel may select items within the display 402 by using the first and second function buttons 404 and 406. Furthermore, the display 402 may be implemented using a liquid crystal display (LCDs). However, in other example implementations, the display 402 can be implemented using any other suitable display technology.

The example first and second function buttons 404 and 406 may include any number or types of buttons for moving, manipulating, and/or selecting items within the display area. For example, the first function button 404 may include a scroll wheel. Additionally, the first and the second function buttons 404 and 406 may be placed in any location on the example verification controller 190 as determined by a designer and/or manufacturer of the verification controller 190.

The example first field device icon 420 corresponds to the field device 112a of FIG. 1 and the second field device icon 421 corresponds to the field device 112b. The first field device icon 420 of FIG. 4 indicates by the fill in the lower circle that the verification controller 190 has verified the communication path from the field device 112a to the I/O card 132a of FIG. 1. The second field device icon 421 indicates by the fill in the lower circle that the verification controller 190 is currently in the process of verifying a communication path between the field device 112b and the I/O card 132a. Process control personnel may select either one of the first field device icon 420 or the second field device icon 421 to open a new window to display information regarding the selected process control icon. For example, if the first field device icon 420 is selected, a window opens displaying the type of the field device 112a, an identifier of the communicatively coupled VJB 111a to the field device 112a, an identifier of the I/O card 123a, the date and time the communication path from the field device 112a to the process controller 104 and/or the I/O card 132a was verified, and/or any other field device process control information.

Process control personnel may select the VERIFYING text within the display 402 to open a window with more information regarding the verification process. For example, the window may include a location in the process control system 100 where the command signal was sent, the time since the command signal was sent, if a reception signal has been received, and/or if the verification controller 190 is attempting to determine if the field device 112b is incorrectly coupled to another I/O card. The process control personnel may stop the verifying process by selecting the cancel button within the display 402.

Process control personnel may setup the verification controller 190 by selecting the SETUP button on the front panel 408 to open a new window in the display 402 for setting up a verification process. Within the window, process control personnel may select one or more field devices by selecting from a list of field devices, by browsing a directory for the field devices, and/or selecting field devices in a schematic of a process control system. Alternatively, process control personnel may select an identifier of a VJB and/or an identifier of an I/O card to verify a communication path. Upon selecting a field device, the verification controller 190 displays information regarding that field device including, for example, identification information, field device type, etc. Process control personnel may manually select the type of verification signal to send through the process control system by selecting any one of the ANALOG OUTPUT, ANALOG INPUT, DIGITAL INPUT, and/or DIGITAL OUTPUT buttons on the front panel 408. The front panel 408 may include additional verification signal types and/or verification signal protocols. Upon setting up a field device for verification, process control personnel may initiate the verification process by selecting the VERIFY button within the front panel 408.

To process data communication with the process control system 100 of FIG. 1, the example verification controller 190 includes the transceiver 410. The example transceiver 410 may include any type of antenna, wireless transmitter, wireless receiver, and/or any wired connection. The example transceiver 410 receives an electrical signal (e.g., reception signal) from the transceiver 103 of FIG. 1 or the transceiver 210 of FIG. 2 and converts the electrical signal into analog, discrete, and/or digital information for processing by the verification controller 190. Additionally, the example transceiver 410 of FIG. 4 receives and converts analog, discrete, and/or digital information (e.g., a command signal) from verification controller 190 into an electrical signal to transmit to the transceiver 103 or the transceiver 210. The transceiver circuit 410 can be implemented using a wireless communication medium (e.g., wireless Ethernet, IEEE-802.11, Wi-Fi®, Bluetooth®, etc.). In other example implementations, the transceiver 410 may be communicatively coupled to the process control system 100 via a wired communication path. The wired communication path may operate on any protocol including Ethernet, universal serial bus (USB), IEEE 1394, etc.

Figure 5:
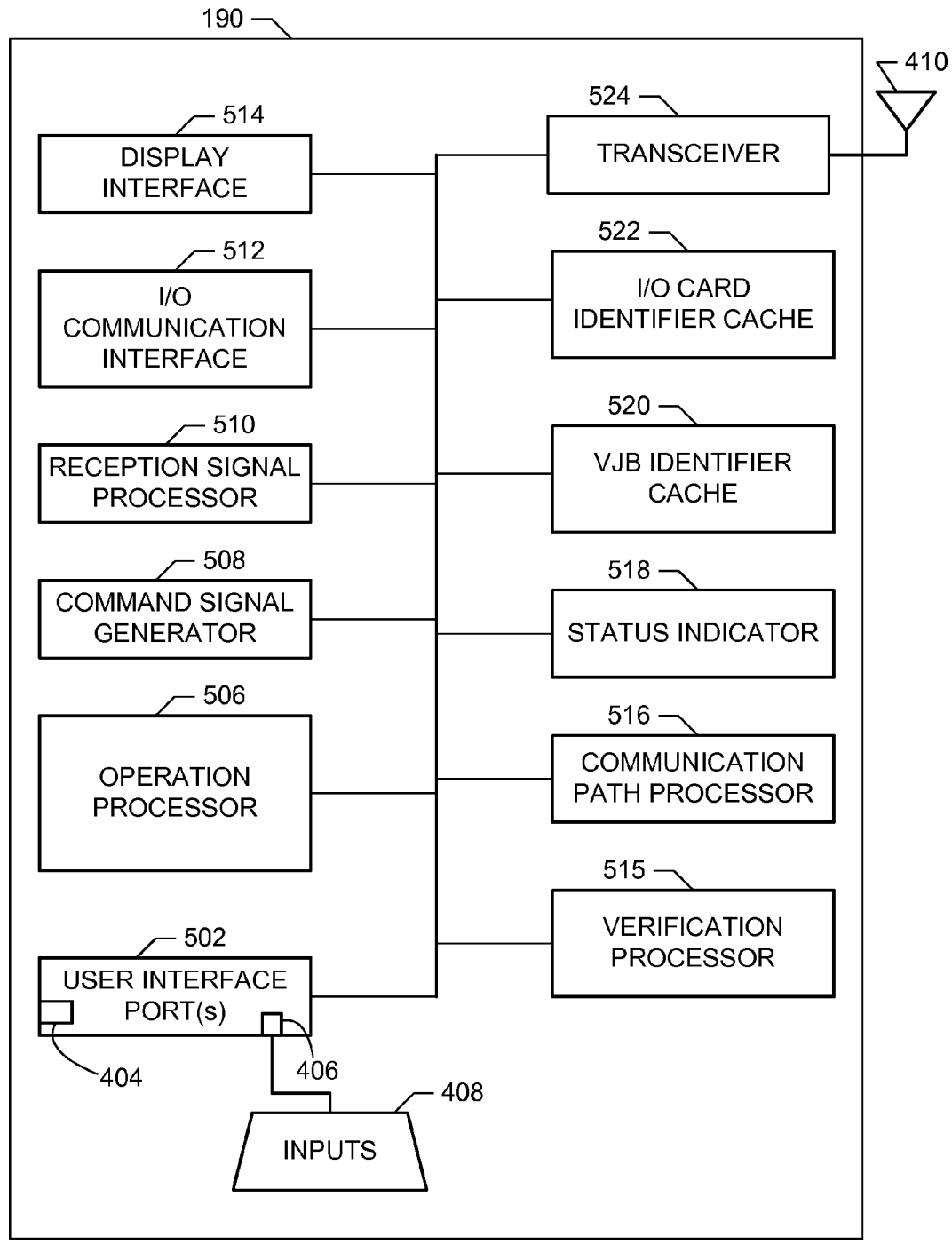
FIG. 5 is a block diagram of the example verification controller of FIGS. 1 and 4.

FIG. 5 is a block diagram of the example verification controller 190 of FIGS. 1 and 4. To enable process control personnel to interact with and/or access the verification controller 190, the example verification controller 190 includes one or more user interface ports 502. In the illustrated example, the user interface port 502 includes the first function button 404, the second function button 406, and inputs from the buttons on the front panel 408 of FIG. 4. Additionally, the user interface port 502 of FIG. 5 may include an interface with the display 402 when the display 402 includes a touchscreen. The user interface port 502 receives the input from any of the buttons 404-408 and forwards the input to an operation processor 506.

The example operation processor 506 of FIG. 5 can be implemented using a microprocessor, a microcontroller, an application specific integrated circuit (ASIC), a digital signal processor, etc. The operation processor 506 communicates instructions or commands to other portions of the example verification controller 190 to control the operations of those portions. For example, in response to the verification controller 190 receiving a reception signal, the verification controller 190 may instruct a verification processor 515 to determine if a communication path is verified.

To generate command signals, the example verification controller 190 includes a command signal generator 508. The example command signal generator 508 of FIG. 5 generates a command signal in response to an instruction from the operation processor 506. The command signal generator 508 may access a VJB identifier cache 520 to include in the command signal an identifier of a VJB that is intended to receive the command signal. Alternatively, if the command signal is intended to be transmitted to the transceiver 103 of FIG. 1, the command signal generator 508 may access an I/O card identifier cache 522 to include in the command signal an identifier of an I/O card to which the process controller 104 of FIG. 1 should transmit a verification signal though. Upon generating a command signal, the example command signal generator 508 may forward the command signal to an I/O communication interface 512 for transmission. Additionally, when the command signal generator 508 generates a command signal for a VJB, the command signal generator 508 may generate an instruction for the process controller 104 to monitor an I/O card that is specified to be communicatively coupled to the VJB.

To receive reception signals from a VJB and/or the transceiver 103, the example verification controller 190 of FIG. 5 includes a reception signal processor 510. The example reception signal processor 510 of FIG. 5 processes a received reception signal and sends an instruction to the operation processor 506 that a reception signal has been received. Additionally, the instruction may include any VJB identifier, field device identification information, I/O card identifier, and/or any other signal identification information included within the reception signal.

The example verification controller 190 includes the I/O communication interface 512 to exchange information with the process controller 104 and/or a VJB via a communication path. In the illustrated example of FIG. 5, the I/O communication interface 512 can generate and/or process any analog, discrete, and/or digital signal. Additionally, the example I/O communication interface 512 may generate any of the signals types (e.g., analog, discrete, digital, etc.) according to any process control or proprietary protocols.

To display verification information and/or other field device information within the display 402 of FIG. 4, the verification controller 190 includes a display interface 514. In the illustrated example, the display interface 514 is configured to drive and control a liquid crystal display (LCD). For example, the display interface 514 may be configured to control the display 402 mounted on the verification controller 190. However, in other example implementations, the display interface 514 may instead be configured to drive other display types.

To verify a communication path, the example verification controller 190 includes the verification processor 515. The example verification processor 515 receives instructions from the operation processor 506 to verify a communication path. The verification processor 515 determines if a communication path is verified by comparing information associated with a previously transmitted command signal and information from a reception signal to specified identifiers for a first portion of a process control system and a second portion of a process control system.

For example, if the command signal generator 508 generates a command signal that includes an identifier for the VJB 111a and identification information for the field device 112a, the verification processor 515 stores a copy of the command signal with the identifiers. Then, when a reception signal is received by the verification controller 190, the operation processor 506 sends information associated with the reception signal to the verification processor 515. The example verification processor 515 determines if the reception signal corresponds to the command signal. If the reception signal resulted from the command signal, the verification processor 515 checks the identifier in the instruction from the operation processor 506. In the example of FIG. 1, the reception signal includes an identifier of the I/O card 132a. The verification processor 515 then accesses a list of specified identifiers to determine if the field device 112a is specified to be communicatively coupled to the I/O card 132a. If they are specified to be communicatively coupled, the verification processor 515 sends an instruction to a status indicator 518 to indicate the communication path 128a of FIG. 1 is verified. In another example, if the identifier associated with the reception signal is for the I/O card 134a, the verification processor 515 determines the I/O card 134a is not specified to be communicatively coupled to the field device 112a. As a result, the verification processor 515 sends an instruction to the status indicator 518 to indicate the communication path 128a is not verified and to indicate the I/O card 134a is incorrectly communicatively coupled to the field device 112a.

In another example, the verification processor 515 may not receive an instruction from the operation processor 506 indicating a reception signal has been received. In this case, the verification processor 515 may wait a time period for an indication of a reception signal. After this time period, the verification processor 515 may send an instruction to a communication path processor 516 to determine another method for determining which I/O card is communicatively coupled to the VJB 111a.

The example communication path processor 516 of FIG. 5 tracks a test strategy when a communication path cannot be verified. This includes tracking which I/O cards, I/O slots, and/or which I/O channels have been tested, if reverse polarity has been tested, and if device type has been tested. For example, if the example communication path processor 516 receives an instruction from the verification processor 515 indicating the communication path 128a is incorrectly wired, the communication path processor 516 may select a different I/O card, a different I/O slot on an I/O card, and/or a different I/O channel on an I/O card to determine a communication path. The example communication path processor 516 then instructs the command signal generator 508 to resend the command signal and an instruction to the process controller 104 to charge which I/O card, I/O slot, and/or I/O channel to monitor for a verification signal. In cases where the verification controller 190 verifies a communication path for an output field device, the communication path processor 516 may send an instruction for the process controller 104 to change through which I/O card, I/O slot, and/or I/O channel the verification signal is sent.

If the communication path processor 516 determines all possible I/O cards, I/O slots, and/or I/O channels have been tested, the communication path processor 516 sends the command signal generator 508 an instruction to resend the command signal with an instruction to reverse the polarity of the verification signal. Additionally, the communication path processor 516 sends an instruction to a status indicator 518 to indicate reverse polarity is being tested and sets a flag indicating reverse polarity has been tested.

If the communication path processor 516 determines all possible I/O cards, I/O slots, and/or I/O channels have been tested with reverse polarity, the communication path processor 516 sends the command signal generator 508 an instruction to resend the command signal to the opposite side of the process control system 100. For example, if the verification controller 190 was transmitting command signals to the VJB 111a to verify the communication path 128a because the field device 112a was specified as an input device, the communication path processor 516 would instruct the command signal generator 508 to generate a command signal for the process controller 104 to determine if the field device 112a is an output device. Additionally, the communication path processor 516 sends an instruction to the status indicator 518 to indicate device type is being tested and sets a flag indicating device type has been tested.

If the communication path processor 516 determines all possible I/O cards, I/O slots, and/or I/O channels have been tested with reverse polarity and device type, the communication path processor 516 may send an instruction to the status indicator 518 indicating the communication path 128a from the VJB 111a is not connected to the process controller 104.

To store VJB identifiers and/or field device identification information, the example verification controller 190 includes the VJB identifier cache 520. The example VJB identifier cache 520 of FIG. 5 may be implemented by EEPROM, RAM, ROM, and/or any other type of memory. The VJB identifier cache 520 stores a list of specified VJB identifiers and identification information for field devices. Additionally, the VJB identifier cache 520 may include a list defining which VJB is communicatively coupled to which field device. Furthermore, the VJB identifier cache 520 may include a list defining which VJB is specified to be communicatively coupled to which I/O card. Process control personnel may store the identifiers and the lists within the VJB identifier cache 520 through any of the inputs 404-408 and/or through a port to download the identifiers onto the verification controller 190.

To store I/O card identifiers, the example verification controller 190 includes the I/O card identifier cache 522. The example I/O card identifier cache 522 of FIG. 5 may be implemented by EEPROM, RAM, ROM, and/or any other type of memory. The example I/O card identifier cache 522 stores a list of specified I/O card identifiers. Additionally, the I/O card identifier cache 522 may include a list defining which I/O card is communicatively coupled to which VJB. Process control personnel may store the identifiers and the lists within the I/O card identifier cache 522 through any of the inputs 404-408 and/or through a port to download the identifiers onto the verification controller 190.

To process data communication with the VJBs and/or the process controller 104 of FIG. 1, the example verification controller 190 includes a transceiver circuit 524. The example transceiver circuit 524 receives an electrical signal from the transceiver 103 of FIG. 1 and/or the transceiver 210 of FIG. 2 and converts the electrical signal into analog, discrete, and/or digital information for processing by the operation controller 506. Additionally, the example transceiver circuit 524 of FIG. 5 receives and converts analog, discrete, and/or digital information from the command signal generator 508 into a signal for transmission via the transceiver 410 to the transceiver 103 and/or the transceiver 210. The transceiver circuit 524 is communicatively coupled to the example transceiver 410 of FIG. 4 and can be implemented using a wireless communication medium (e.g., wireless Ethernet, IEEE-802.11, Wi-Fi®, Bluetooth®, etc.). In other example implementations, the transceiver circuit 524 may be communicatively coupled via the transceiver 410 to the process controller 104 and/or the VJBs via a wired communication path. The wired communication path may operate on any protocol including Ethernet, universal serial bus (USB), IEEE 1394, etc.

While an example manner of implementing the verification controller 190 is depicted in FIG. 5, one or more of the interfaces, data structures, elements, processes and/or devices illustrated in FIG. 5 may be combined, divided, rearranged, omitted, eliminated and/or implemented in any other way. For example, the example user interface port 502, the example operation processor 506, the example command signal generator 508, the example reception signal processor 510, the example I/O communication interface 512, the example display interface 514, the example verification processor 515, the example communication path processor 516, the example status indicator 518, the example VJB identifier cache 520, the example I/O card identifier cache 522, and/or the example transceiver 524 illustrated in FIG. 5 may be implemented separately and/or in any combination using, for example, machine-accessible or readable instructions executed by one or more computing devices and/or computing platforms (e.g., the example processing platform 1010 of FIG. 10).

Further, the example user interface port 502, the example operation processor 506, the example command signal generator 508, the example reception signal processor 510, the example I/O communication interface 512, the example display interface 514, the example verification processor 515, the example communication path processor 516, the example status indicator 518, the example VJB identifier cache 520, the example I/O card identifier cache 522, the example transceiver 524, and/or more generally, verification controller 190 may be implemented by hardware, software, firmware and/or any combination of hardware, software and/or firmware. Thus, for example, any of the example user interface port 502, the example operation processor 506, the example command signal generator 508, the example reception signal processor 510, the example I/O communication interface 512, the example display interface 514, the example verification processor 515, the example communication path processor 516, the example status indicator 518, the example VJB identifier cache 520, the example I/O card identifier cache 522, the example transceiver 524, and/or more generally, the verification controller 190 can be implemented by one or more circuit (s), programmable processor(s), application specific integrated circuit(s) (ASIC(s)), programmable logic device(s) (PLD(s)) and/or field programmable logic device(s) (FPLD (s)), etc.

FIG. 6 is a block diagram illustrating a portion of the example process control system 100 of FIG. 1 including example communication paths 128a, the verification controller 190, the verification junction boxes 111a-b, the process controller 104 and/or the workstation 102 of FIGS. 1, 2, 3, 4, and 5. The process control system 100 includes a first portion 601 of the process control system 100 and a second portion 602 of the process control system 100. The first portion 100 includes the process controller 104, the I/O card 132a, the transceiver 103, the workstation 102, the LAN 106, and the multi-conductor cable 128a as described in FIG. 1. Additionally, the I/O card 132a includes an I/O slot 612 and an I/O slot 614. In the example if FIG. 4, the multi-conductor cable 128a is split into two communication paths, each connected to a different I/O slot on the I/O card 132a.

The second portion 602 includes the VJBs 111a-b connected to respective field devices 112a-b. The second terminal 206 of each VJB 111a-b is connected to the positive terminal on the respective field device 112a-b and the third terminal 208 (e.g., ground) of each VJB 111a-b is connected to the negative terminals on the respective field devices 112a-b. Additionally, the third terminal 208 within the VJB 111a communicatively couples a ground wire 620b to the I/O card 132a via the multi-conductor cable 128a. Likewise, the third terminal 208 within the VJB 111b communicatively couples a ground wire 622b to the I/O card 132a via the multi-conductor cable 128a.

The VJBs 111a-b are powered via a power supply 610. The power supply 610 may include any known type of power supply. The power supply provides power to the VJBs 111a-b via the power terminals 202 of FIG. 2 (not shown in FIG. 6). The power travels through respective isolation devices 318b and 318d. The isolation devices 318b and 318d may be implemented using galvanic isolators. By isolating the circuitry blocks 300a-b from the power supply 610, any power variation (e.g., power surges, current spikes, etc.) from the power supply 610 will not affect the circuitry blocks 300a-b, the I/O card 132a, and/or the field devices 112a-b.

Additionally, the VJBs are communicatively coupled to the I/O card 132a via respective communication wires 620a and 622a. The communication wires 620a and 622a couple to the first terminal 204 on the respective VJBs 111a-b, which then couple to isolation devices 318a and 318c. The isolation devices 318a and 318c may include a galvanic or optical isolator to ensure the respective VJB circuitry 300a-b or the field devices 112a-b are not damaged or affected by any power variations, electro-magnetic radiation, and/or electrostatic pulse from the multi-conductor cable 128a, the I/O card 132a and/or the process controller 104.

The example verification controller 190 verifies the field devices 112a-b are communicatively coupled to the respective slots 612 and 614 on the I/O card 132a by sending a verification signal to either the first portion 601 or the second portion 602 of the process control system 100. If the field device 112a is an input device, the verification controller 190 sends a command signal to the VJB 111a. In response to receiving the command signal, the VJB 111a may send a protocol signal via the terminal 206 to the field device 112a to determine if the field device 112a is communicatively coupled. Upon verifying the field device 112a is communicatively coupled to the VJB 111a, the VJB 111a transmits a verification signal via the first terminal 204, the communication wire 620a and the multi-conductor cable 128a (e.g., the wired communication path) to the I/O slot 612 within the I/O card 132a. In response to receiving the verification signal, the I/O card 132a forwards the verification signal to the process controller 104. The process controller 104 then transmits a reception signal to the verification controller 190 via the workstation and the transceiver 103. The process controller 104 includes an identifier of the I/O card 132a and the I/O slot and an identifier of the I/O card slot that received the verification signal. Upon receiving the reception signal, the verification controller 190 compares the identifier of the I/O card 132a, the I/O slot 612, the VJB 111a and/or the field device 112a and determines the devices are specified to be communicatively coupled together.

In the example if FIG. 6, if the field device 112b is an output device, the verification controller 190 sends a command signal to the process controller 104 via the transceiver 103 and the workstation 102. The command signal may include an identifier of the I/O card 132a and the I/O slot 614. In response to receiving the command signal, the process controller 104 transmits a verification signal to the I/O card 132a, which forwards the verification signal to the VJB 111b via the multi-conductor cable 128a, the communication wire 622a and the first terminal 204. In response to receiving the verification signal, the VJB 111b may send a protocol signal via the terminal 206 to the field device 112b to determine if the field device 112b is communicatively coupled. Upon verifying the field device 112b is communicatively coupled to the VJB 111b, the VJB 111b transmits a reception signal to the verification controller 190. The reception signal includes an identifier of the VJB 111b and/or the field device 112b. Upon receiving the reception signal, the verification controller 190 compares the identifier of the I/O card 132a, the I/O slot 614, the VJB 111b and/or the field device 112b and determines the devices are specified to be communicatively coupled together.

In another example, if the communication wire 620a is incorrectly coupled to the I/O slot 614 and the verification controller 190 attempts to verify the communication path, the verification controller 190 may not receive a reception signal because the process controller 104 is monitoring the I/O slot 612 for the verification signal. As a result of not receiving the reception signal, the verification controller 190 may transmit the command signal again to the VJB 111a, but instruct the process controller to monitor the I/O slot 614 for the verification signal. In response to receiving the verification signal via the I/O slot 614, the process controller 104 sends a reception signal including the identifier of the I/O slot 614 to the verification controller 190. In response to the reception signal, the verification controller 190 determines the communication path is incorrectly coupled and displays the identifier of the VJB 111a incorrectly communicatively coupled to the I/O card slot 614.

In another example, communication wire 620a may be reversed with the ground wire 620b such that the communication wire 620a is coupled to the third terminal 208 and the ground wire 620 is coupled to the first terminal 204. As a result, the verification controller 190 will not receive a reception signal until it instructs the VJB 111a to reverse the polarity of the verification signal. As a result, when the verification controller 190 receives a reception signal from the process controller 104, the verification controller 190 indicates the communication path has its polarity reversed.

FIGS. 7A, 7B, 7C, 8, and 9 are flowcharts of example methods that may be carried out to implement the example verification controller 190 of FIGS. 1, 4, 5 and/or 6, the example VJB 111 of FIGS. 1, 2, 3, and/or 6, and/or the example process control system of FIGS. 1 and/or 6. The example methods of FIGS. 7A, 7B, 7C, 8, and/or 9 may be carried out by a processor, a controller and/or any other suitable processing device. For example, the example methods of FIGS. 7A, 7B, 7C, 8, and/or 9 may be embodied in coded instructions stored on any tangible computer-readable medium such as a flash memory, a CD, a DVD, a floppy disk, a ROM, a RAM, a programmable ROM (PROM), an electronically-programmable ROM (EPROM), an electronically-erasable PROM (EEPROM), an optical storage disk, an optical storage device, magnetic storage disk, a magnetic storage device, and/or any other medium that can be used to carry or store program code and/or instructions in the form of methods or data structures, and which can be accessed by a processor, a general-purpose or special-purpose computer, or other machine with a processor (e.g., the example processor platform 1010 discussed below in connection with FIG. 10). Combinations of the above are also included within the scope of computer-readable media. Methods comprise, for example, instructions and/or data that cause a processor, a general-purpose computer, special-purpose computer, or a special-purpose processing machine to implement one or more particular methods. Alternatively, some or all of the example methods of FIGS. 7A, 7B, 7C, 8, and/or 9 may be implemented using any combination(s) of ASIC(s), PLD(s), FPLD(s), discrete logic, hardware, firmware, etc. Also, some or all of the example methods of FIGS. 7A, 7B, 7C, 8, and/or 9 may instead be implemented manually or as any combination of any of the foregoing techniques, for example, any combination of firmware, software, discrete logic and/or hardware. Further, many other methods of implementing the example operations of FIGS. 7A, 7B, 7C, 8, and/or 9 may be employed. For example, the order of execution of the blocks may be changed, and/or one or more of the blocks described may be changed, eliminated, sub-divided, or combined. Additionally, any or all of the example methods of FIGS. 7A, 7B, 7C, 8, and/or 9 may be carried out sequentially and/or carried out in parallel by, for example, separate processing threads, processors, devices, discrete logic, circuits, etc.

Figure 7A:
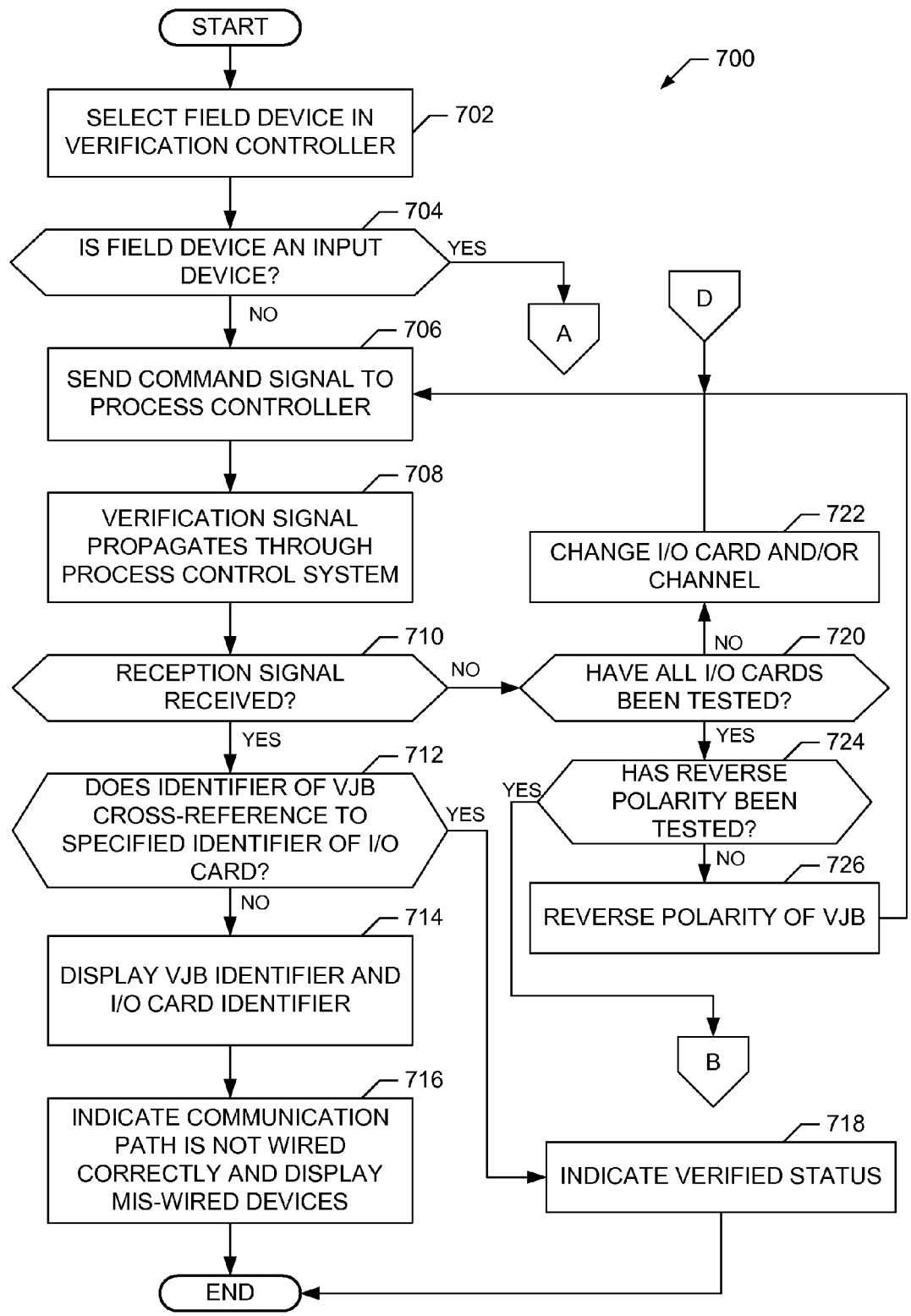
FIGS. 7A-7C are flowcharts of an example method that may be used to implement the verification controller of FIGS. 1, 3 and 4.

The example method 700 of FIG. 7A describes a verification process to determine if a field device is communicatively coupled to an I/O card. The example method 700 begins when a field device is selected in the verification controller (block 702). The field device may be selected by identification information including device tag number and/or an electronic serial number. Furthermore, the field device may be selected by browsing through a list of field devices. Alternatively, a field device may be selected by selecting an I/O card and/or an I/O card slot within the process controller 104 of FIGS. 1 and/or 4 that is specified to be connected to the field device.

The example method 700 continues when the verification controller 190 determines if the selected field device is an input device (block 704). The verification controller 190 determines if the field device is an input device using any device information included within the selected field device and/or by information within identification information of the field device. If the field device is an input device, the verification controller transmits a command signal to the VJB 111 of FIGS. 1, 2, 3, and/or 6 communicatively coupled to the field device (block 732 in FIG. 7B). The command signal may be transmitted via a wireless communication link or a wired communication link. Alternatively, the verification controller 190 may send the command signal directly to the field device.

If the verification controller 190 determines the field device is not an input device (e.g., the field device is an output device) (block 704), the verification controller 190 transmits the command signal to the process controller 104 (block 706). The command signal may be transmitted via a wireless communication path to the transceiver 103 included within the workstation 102, which forwards the command signal to the process controller 104 or, alternatively, the command signal may be transmitted directly to the process controller 104. In response to receiving the command signal, the process controller 104 transmits a verification signal through a portion of the process control system (block 708). The process controller 104 selects the appropriate portion of the process control system using an I/O card identifier that is included in the command signal. The I/O card identifier instructs the process controller 104 through which I/O card, I/O channel, and/or I/O slot to transmit the verification signal through.

The example method 700 continues when the verification controller 190 determines if it has received a reception signal corresponding to the transmitted command signal (block 710). If the verification controller 190 receives a reception signal (block 710), the verification controller 190 determines if an identifier of the VJB 111 included in the reception signal cross-references to the specified identifier of the I/O card in the corresponding command signal (block 712). The verification controller 190 determines if the identifiers cross-reference by comparing the identifiers to a specification table that shows which I/O cards and/or shots are defined to be communicatively coupled to which field devices. If the VJB identifier cross-references to the identifier of the I/O card (block 712), the verification controller 190 indicates the communication path between the field device and the process controller 104 is verified (block 718) and the example method 700 ends.

If the VJB identifier does not cross-reference to the identifier of the I/O card (block 712), the verification controller 190 displays the VJB identifier and the I/O card identifier (block 714). Additionally, the verification controller 190 indicates the communication path is not wired according to the specification table and displays the I/O card communicatively coupled (e.g., wired) to the VJB 111 and/or the field device that returned the reception signal. Then, the example method 700 ends.

However, if the verification controller 190 does not receive the reception signal (block 710), the verification controller determines if all possible I/O cards, I/O channels, and/or I/O slots within the process controller 104 have been tested (block 720). If not all of the I/O cards, I/O channels, and/or I/O slots have been tested, the verification controller 190 selects another I/O card, I/O channel and/or I/O slot (block 722). By selecting another I/O card, I/O channel, and/or I/O slot, the verification controller 190 attempts to determine if the field device is connected to a non-specified I/O card, I/O channel, and/or I/O slot. The verification controller 190 then sends the command signal to the process controller 104 with an instruction to send the verification signal through the selected I/O card, I/O channel, and/or I/O slot (block 706). If the verification controller 190 receives a reception signal from the intended VJB 111 (block 710), the verification controller 190 indicates which I/O card, I/O channel, and/or I/O slot is incorrectly communicatively coupled to the VJB 111 and/or the field device (block 716) and the example method 700 ends.

The example method 700 continues if all of the I/O cards, I/O channels, and/or I/O slots have been tested (block 720). The verification controller 190 then determines if reverse polarity has been tested (block 724). The verification controller 190 determines if reverse polarity has been tested by checking if a reverse polarity flag has been set in an identifier of the VJB 111. If reverse polarity has not been tested, the verification controller 190 sets a reverse polarity flag in an identifier of the VJB 111 (block 726) and sends a command signal including an instruction to reverse polarity of the verification signal to the process controller 104 (block 706). In response to receiving the command signal, the process controller 104 transmits a verification signal with reverse polarity.

Figure 7B:
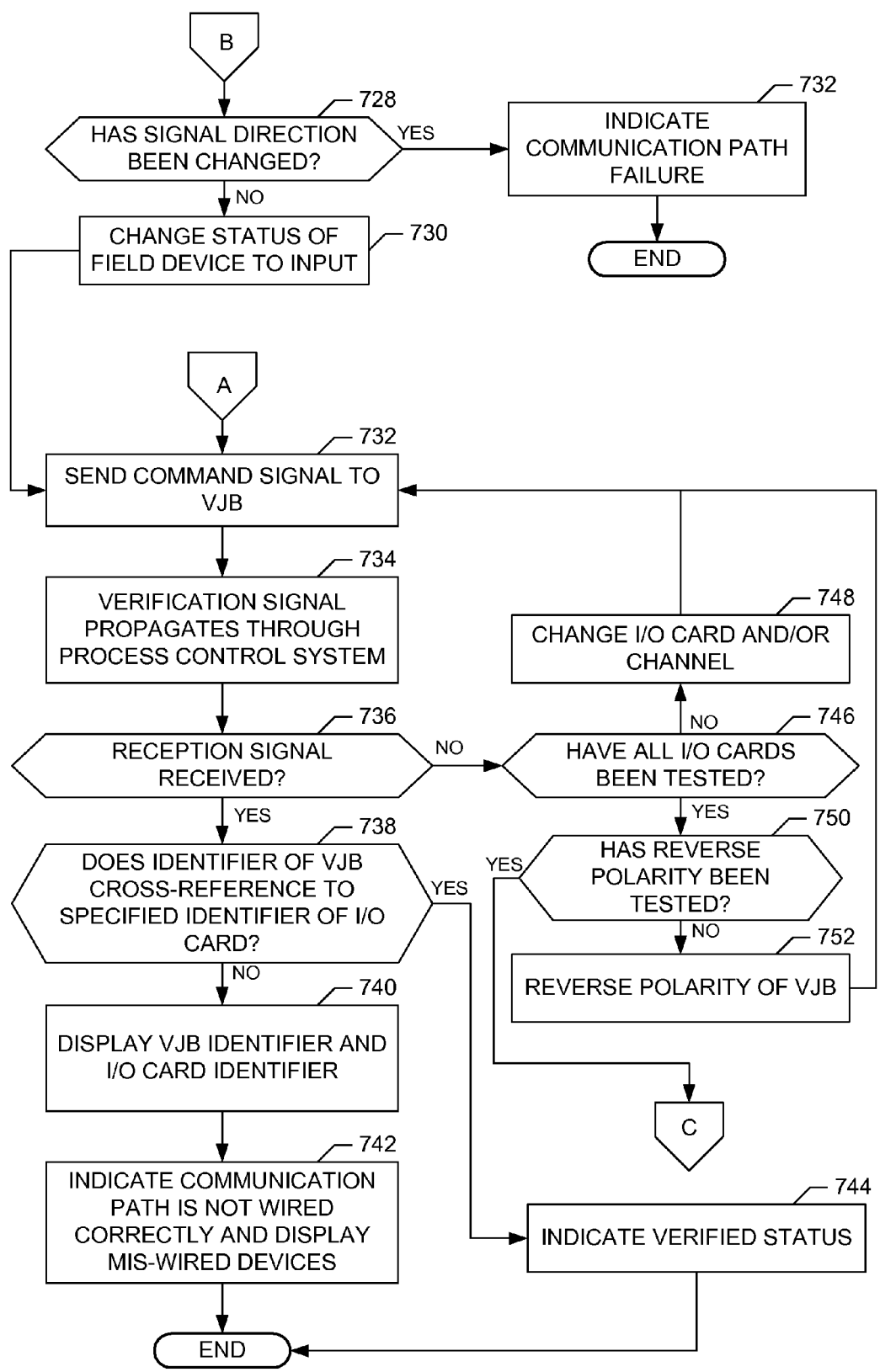

However, if reverse polarity has been tested (block 724), the verification controller 190 determines if the signal direction has been changed (block 728) in FIG. 7B. The verification controller 190 determines if the signal direction has already been tested by checking if a signal direction flag has been set in the identifier of the VJB 111. A signal direction change means determining if the specified input field device is implemented as an output device in the process control system. If the signal direction has been changed, the verification controller 190 indicates there is a communication path failure (block 732). The communication path failure may be a result of the field device being improperly connected to the VJB 111 and/or to an unspecified VJB 111. Additionally, the communication path failure may result from an improper connection between the VJB 111 and the specified I/O card, I/O channel, and/or I/O slot. Upon indicating the communication path failure (block 732), the example method 700 ends.

The example method 700 continues if the verification controller 190 determines the signal direction has not been changed (block 728). The verification controller 190 then changes the status of the field device from an output device to an input device (block 730). Additionally, by changing the status of the field device, an indication may be displayed showing the change in status to the field device. Next, the verification controller 190 sends the command signal to the VJB 111 that is specified to be communicatively coupled to the field device (block 732). Additionally, the verification controller 190 may instruct the process controller 104 which I/O card, I/O channel, and/or I/O slot to check for the verification signal. In response to receiving the command signal, the VJB 111 transmits a verification signal through a portion of the process control system (block 734).

The verification controller 190 determines if it has received a reception signal from the process controller 104 and/or workstation 102 corresponding to the transmitted command signal to the VJB 111 (block 736). If the verification controller 190 receives a reception signal (block 736), the verification controller 190 determines if an identifier of the I/O card included in the reception signal cross-references to the specified identifier of the VJB 111 and/or field device in the corresponding command signal (block 738). If the VJB 111 identifier cross-references to the identifier of the I/O card, the verification controller 190 indicates the communication path between the field device and the process controller 104 is verified (block 744) and the example method 700 ends.

If the VJB 111 identifier does not cross-reference to the identifier of the I/O card (block 738), the verification controller 190 displays the VJB 111 identifier and the I/O card identifier (block 740). Additionally, the verification controller 190 indicates the communication path is not wired according to the specification table and displays the VJB 111 and/or the field device communicatively coupled (e.g., wired) to the I/O card that received the verification (block 742). Then, the example method 700 ends.

However, if the verification controller 190 does not receive the reception signal (block 736), the verification controller determines if all possible I/O cards, I/O channels, and/or I/O slots within the process controller 104 have been tested (block 746). If not all of the I/O cards, I/O channels, and/or I/O slots have been tested, the verification controller 190 instructs the process controller 104 to select another I/O card, I/O channel and/or I/O slot (block 748) to check for the verification signal. By selecting another I/O card, I/O channel, and/or I/O slot, the verification controller 190 attempts to determine if the field device is connected to a non-specified I/O card, I/O channel, and/or I/O slot. The verification controller 190 then sends the command signal to the VJB 111 (block 732). If the verification controller 190 receives a reception signal from the process controller 104 (block 736), the verification controller 190 indicates which I/O card, I/O channel, and/or I/O slot is incorrectly communicatively coupled to the VJB 111 and/or the field device (block 742) and the example method 700 ends.

The example method 700 continues if all of the I/O cards, I/O channels, and/or I/O slots have been tested (block 746). The verification controller 190 then determines if reverse polarity has been tested (block 750). If reverse polarity has not been tested, the verification controller 190 sets a reverse polarity flag in an identifier of the VJB 111 (block 752) and sends a command signal including an instruction to reverse polarity of the verification signal to the VJB 111 (block 732). In response to receiving the command signal, the VJB 111 transmits a verification signal with reverse polarity.

Figure 7C:
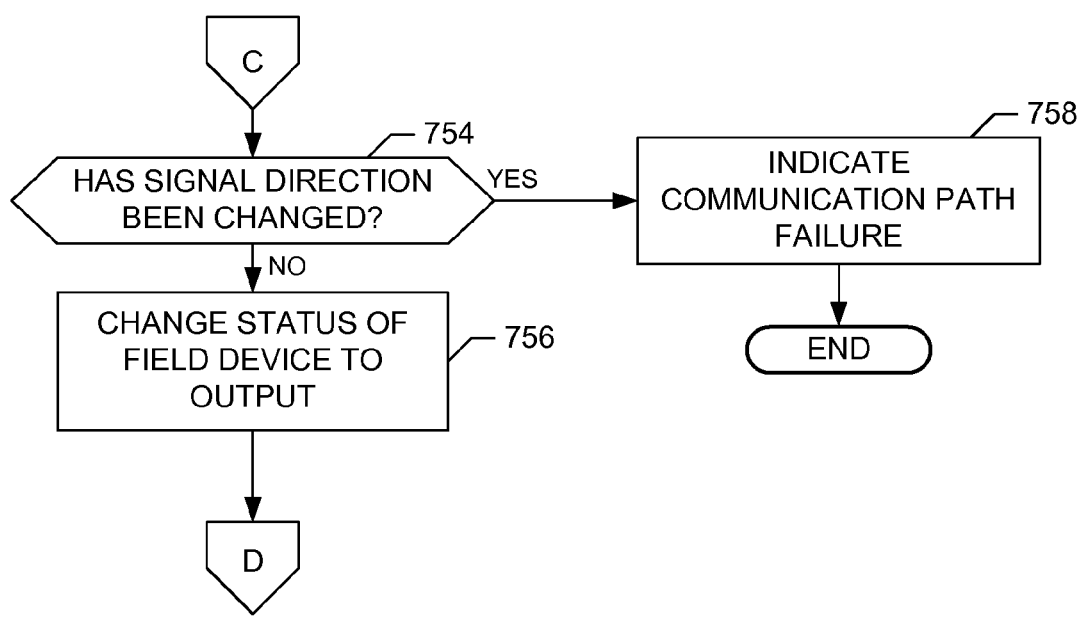

If reverse polarity has been tested (block 750), the verification controller 190 determines if the signal direction has been changed (block 754) in FIG. 7C. If the verification controller 190 determines the signal direction has not been changed, the verification controller 190 changes the status of the field device from an input device to an output device (block 756). Additionally, by changing the status of the field device, an indication may be displayed showing the change in status to the field device. Next, the verification controller 190 sends the command signal to the process controller 104 specified to be communicatively coupled to the field device (block 706) in FIG. 7A. However, if the signal direction has been changed, the verification controller 190 indicates there is a communication path failure (block 758) and the example method 700 ends.

Figure 8:
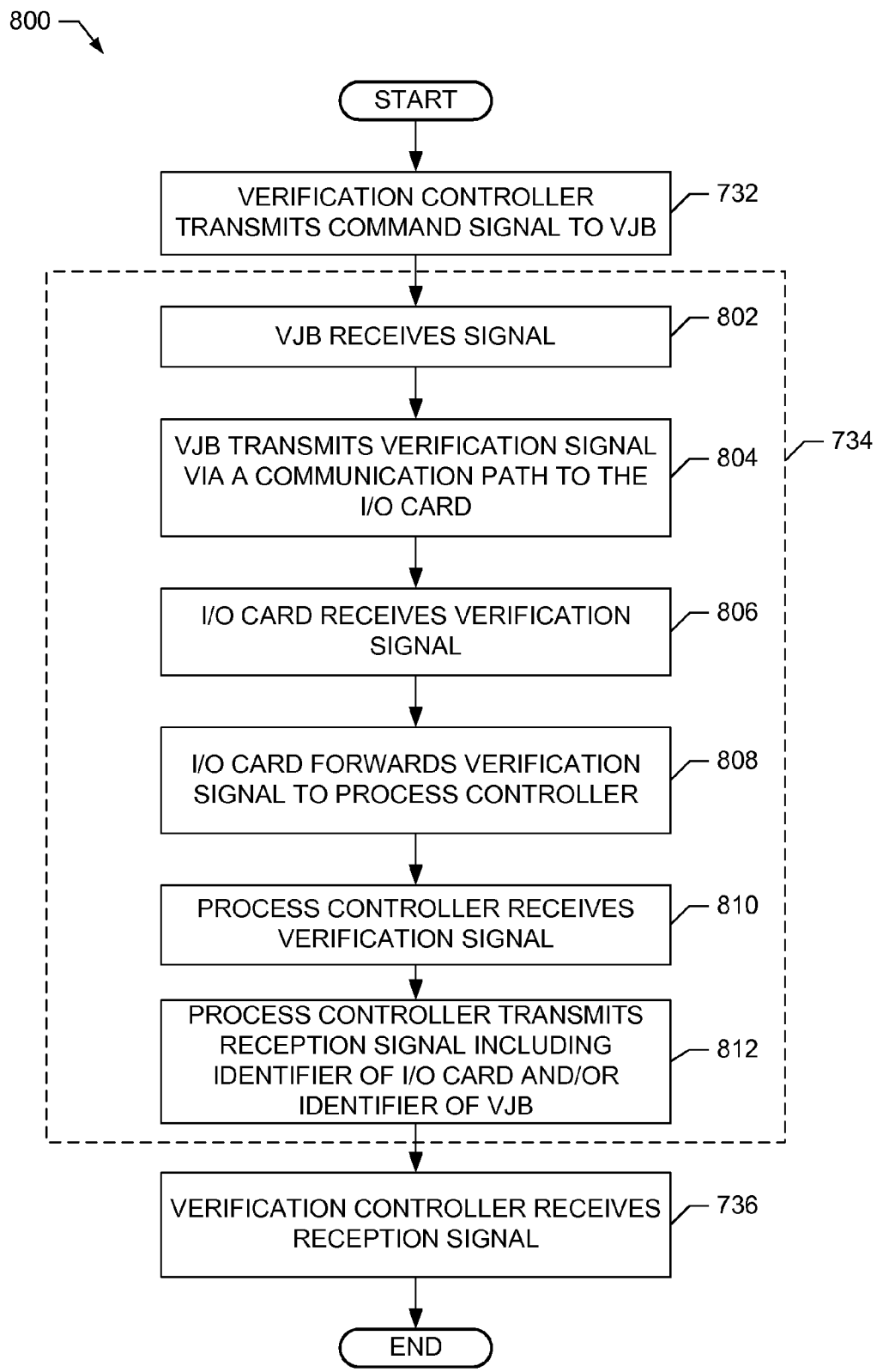
FIGS. 8 and 9 are flowcharts of example methods that may be used to implement the verification controller of FIGS. 1, 3 and 4, the verification junction box of FIGS. 1, 2 and 4, and/or the example process control system of FIGS. 1 and 4.

The example method 800 of FIG. 8 sends a verification signal through a portion of a process control system to determine if a field device is communicatively coupled to an I/O card. The example method 800 begins when the verification controller 190 of FIGS. 1, 4, 5, and/or 6 transmits a command signal to the VJB 111 (block 732). The example verification controller 190 may transmit the command signal via a wireless communication path or, alternatively, a wired communication path. In response to receiving the command signal (block 802), the VJB 111 transmits a verification signal through a portion of the process control system (block 734).

The VJB 111 transmits the verification signal through the portion of the process control system by transmitting the verification signal via a communication path communicatively coupled to an I/O card (block 804). The verification signal may be any analog, discrete, and/or digital signal specified by any process control protocol. Alternatively, the verification signal may be transmitted via the communication path to a communicatively coupled I/O channel and/or I/O slot. In another example method, the VJB 111 may transmit the verification signal to a termination module in a marshalling cabinet, which then forwards the verification signal to the I/O card. In response to receiving the verification signal via the communication path (block 806), the I/O card forwards the verification signal to the example process controller 104 of FIGS. 1 and/or 4 (block 808).

The example method 800 continues when the process controller 104 receives the verification signal from the I/O card (block 810). In response to receiving the verification signal, the process controller 104 transmits a reception signal to the verification controller 190 (block 812). The reception signal may include an identifier of the I/O card that received the verification signal, an identifier of the VJB 111 that received the command signal, and/or an identifier of a field device connected to the VJB 111. Alternatively, the process controller 104 may forward the reception signal to the workstation 102 of FIGS. 1 and/or 4, which then transmits the reception signal to the verification controller 190. The verification controller 190 receives the reception signal (block 736) and the example method 800 ends.

Figure 9:
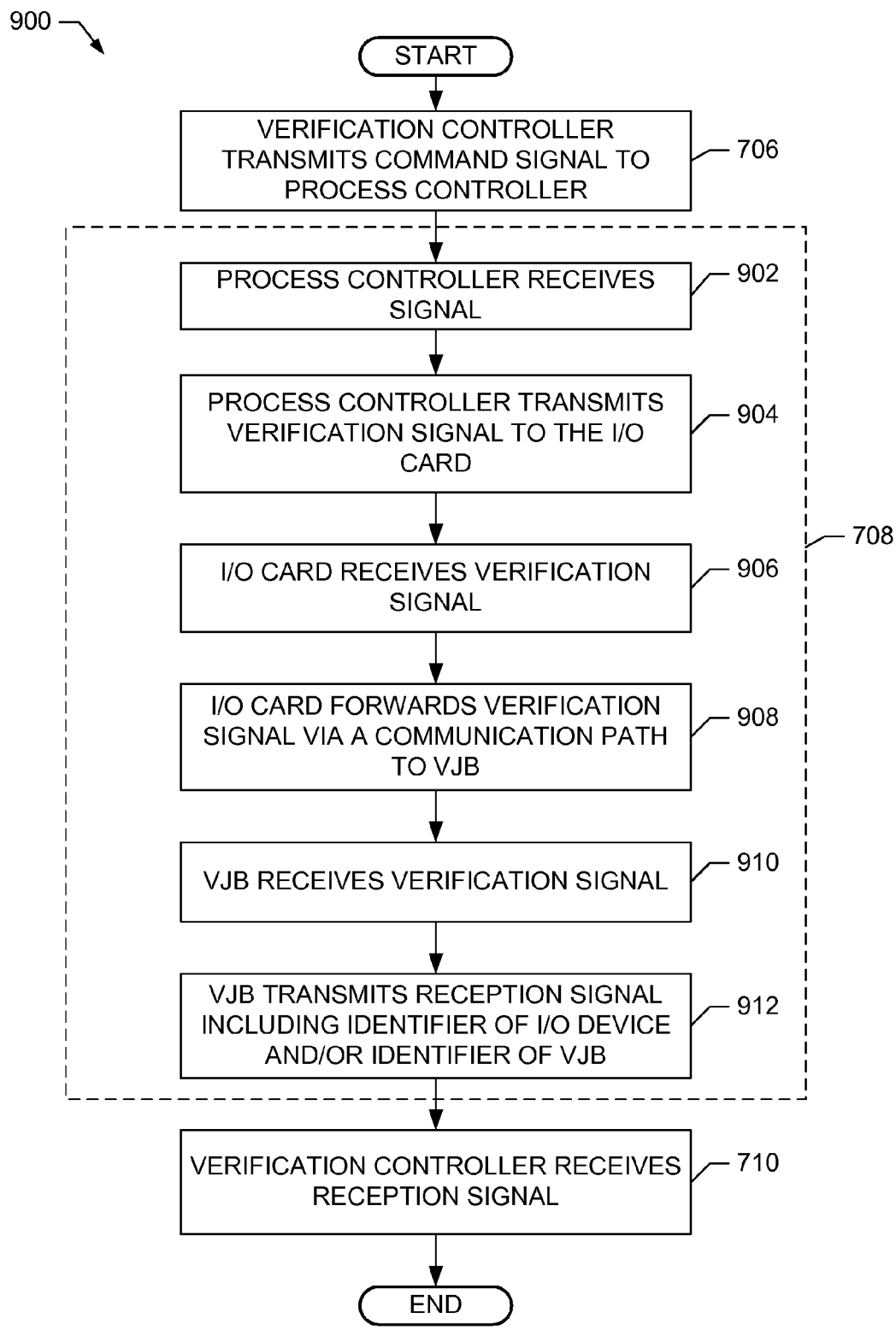

The example method 900 of FIG. 9 sends a verification signal through a portion of a process control system to determine if a field device is communicatively coupled to an I/O card. The example method 900 begins when the verification controller 190 of FIGS. 1, 4, 5, and/or 6 transmits a command signal to the example process controller 104 of FIGS. 1 and/or 4 (block 706). The example verification controller 190 may transmit the command signal via a wireless communication path or, alternatively, a wired communication path. Alternatively, the verification controller 190 may transmit the command signal to the workstation 102 of FIGS. 1 and/or 4, which then transmits the command signal to the process controller 104. The command signal includes an identifier that instructs the process controller 104 through which I/O card, I/O channel, and/or I/O slot to transmit a verification signal through.

In response to receiving the command signal (block 902), the process controller 104 transmits the verification signal through a portion of the process control system (block 734). The process controller 104 transmits the verification signal through the portion of the process control system by transmitting the verification signal to the indicated communicatively coupled an I/O card (block 904). The verification signal may be any analog, discrete, and/or digital signal specified by any process control protocol. Alternatively, the verification signal may be transmitted to a communicatively coupled I/O channel and/or I/O slot. In response to the I/O card receiving the verification signal (block 906), the I/O card forwards the verification via a communication path to a communicatively coupled VJB 111 (block 908). In another example method, the I/O card may transmit the verification signal to a termination module in a marshalling cabinet, which then forwards the verification signal to the VJB 111. In yet another example, the termination module may forward the verification signal to a field junction box, which then forwards the verification to the VJB 111.

The example method 900 continues when the VJB 111 receives the verification signal from the I/O card (block 910). In response to receiving the verification signal, the VJB 111 transmits a reception signal to the verification controller 190 (block 912). The reception signal may include an identifier of the I/O card that transmitted the verification signal, an identifier of the VJB 111, and/or an identifier of a field device connected to the VJB 111. The verification controller 190 receives the reception signal (block 710) and the example method 900 ends.

FIG. 10 is a block diagram of an example processor system 1010 that may be used to implement the example methods and systems described herein. For example, processor systems similar or identical to the example processor system 1010 may be used to implement the workstation 102, the process controller 104, the VJBs 111-111*c* and 115*a*-115*c*, and/or the verification controller 190 of FIG. 1. Although the example processor system 1010 is described below as including a plurality of peripherals, interfaces, chips, memories, etc., one or more of those elements may be omitted from other example processor systems used to implement one or more of the workstation 102, the process controller 104, the VJBs 111-111*c* and 115*a*-115*c*, and/or the verification controller 190.

As shown in FIG. 10, the processor system 1010 includes a processor 1012 that is coupled to an interconnection bus 1014. The processor 1012 includes a register set or register space 1016, which is depicted in FIG. 10 as being entirely on-chip, but which could alternatively be located entirely or partially off-chip and directly coupled to the processor 1012 via dedicated electrical connections and/or via the interconnection bus 1014. The processor 1012 may be any suitable processor, processing unit or microprocessor. Although not shown in FIG. 10, the system 1010 may be a multi-processor system and, thus, may include one or more additional processors that are identical or similar to the processor 1012 and that are communicatively coupled to the interconnection bus 1014.

The processor 1012 of FIG. 10 is coupled to a chipset 1018, which includes a memory controller 1020 and a peripheral input/output (I/O) controller 1022. As is well known, a chipset typically provides I/O and memory management functions as well as a plurality of general purpose and/or special purpose registers, timers, etc. that are accessible or used by one or more processors coupled to the chipset 1018. The memory controller 1020 performs functions that enable the processor 1012 (or processors if there are multiple processors) to access a system memory 1024 and a mass storage memory 1025.

The system memory 1024 may include any desired type of volatile and/or non-volatile memory such as, for example, static random access memory (SRAM), dynamic random access memory (DRAM), flash memory, read-only memory (ROM), etc. The mass storage memory 1025 may include any desired type of mass storage device. For example, if the example processor system 1010 is used to implement the workstation 102 (FIG. 1), the mass storage memory 1025 may include a hard disk drive, an optical drive, a tape storage device, etc. Alternatively, if the example processor system 1010 is used to implement the process controller 104, the VJBs 111-111*c* and 115*a*-115*c*, and/or the verification controller 190, the mass storage memory 1025 may include a solid-state memory (e.g., a flash memory, a RAM memory, etc.), a magnetic memory (e.g., a hard drive), or any other memory suitable for mass storage in the process controller 104, the VJBs 111-111*c* and 115*a*-115*c*, and/or the verification controller 190.

The peripheral I/O controller 1022 performs functions that enable the processor 1012 to communicate with peripheral input/output (I/O) devices 1026 and 1028 and a network interface 1030 via a peripheral I/O bus 1032. The I/O devices 1026 and 1028 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface 1030 may be, for example, an Ethernet device, an asynchronous transfer mode (ATM) device, an 802.11 device, a DSL modem, a cable modem, a cellular modem, etc. that enables the processor system 1010 to communicate with another processor system.

While the memory controller 1020 and the I/O controller 1022 are depicted in FIG. 10 as separate functional blocks within the chipset 1018, the functions performed by these blocks may be integrated within a single semiconductor circuit or may be implemented using two or more separate integrated circuits.

At least some of the above described example methods and/or systems are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example methods and systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and articles of manufacture, the examples are not the only way to implement such systems, methods and articles of manufacture. Therefore, although certain example methods, systems, and articles of manufacture have been described herein, the scope of coverage of this patent is not limited thereto. On the contrary, this patent covers all methods, systems, and articles of manufacture fairly falling within the scope of the appended claims either literally or under the doctrine of equivalents.

What is claimed is:

1. A method to verify a communication path between a field device and a process controller in a process control system, the method comprising:
    transmitting via a first wireless communication path to a first portion of the process control system associated with one of the field device or the process controller, a command signal from a verification controller;
    in response to receiving the command signal in the first portion of the process control system, transmitting a verification signal via a first wired communication path from the first portion of the process control system to a second portion of the process control system associated with the other one of the field device or the process controller;
    in response to receiving the verification signal in the second portion of the process control system, transmitting a reception signal via a second wireless communication path different than the first wireless communication path from the second portion of the process control system to the verification controller; and
    in response to receiving all of (a) the command signal in the first portion of the process control system via the first wireless communication path, (b) the verification signal in the second portion of the process control system via the first wired communication path, and (c) the reception signal in the verification controller via the second wireless communication path, verifying the first wired communication path between the field device and the process controller.

2. A method as defined in claim 1, wherein verifying the first wired communication path between the field device and the process controller comprises determining in the verification controller if the first portion of the process control system is specified to be communicatively coupled to the second portion of the process control system.

3. A method as defined in claim 2, wherein determining if the first portion of the of process control system is specified to be communicatively coupled to the second portion of the process control system includes comparing an identifier associated with the command signal and an identifier associated with the reception signal to a specified identifier of the command signal and a specified identifier of the reception signal.

4. A method as defined in claim 3, wherein the identifier of the reception signal includes at least one of an identification number associated with the second portion of the process control system or an identification number associated with the first portion of the process control system.

5. A method as defined in claim 1, wherein each of the first portion and the second portion of the process control system includes a wireless transceiver.

6. A method as defined in claim 5, wherein the field device is communicatively coupled via a second wired communication path to a verification junction box that includes the wireless transceiver and receives the command signal from the verification controller.

7. A method as defined in claim 6, wherein the process controller is communicatively coupled to an input/output (I/O) card that is coupled via the first wired communication path to the verification junction box.

8. A method as defined in claim 6, wherein the process controller is communicatively coupled via a third wired communication path to a process control manager that includes the transceiver.

9. A method as defined in claim 1, further comprising:
    if the verification controller does not receive the reception signal from the second portion of the process control system, transmitting, via the first wireless communication path from the verification controller, the command signal to a plurality of other portions of the process control system to determine which portion of the process control system is communicatively coupled to the second portion of the process control system;
    in response to receiving the reception signal from the second portion of the process control system, determining to which portion of the process control system the corresponding command signal was sent; and
    indicating the portion of the process control system to which the corresponding command signal was sent as being communicatively coupled via the first wired communication path to the second portion of the process control system.

10. A method as defined in claim 9, further comprising:
    if the verification controller does not receive the reception signal from the second portion of the process control system after transmitting the command signal to the plurality of other portions of the process control system, transmitting a command signal including a reverse polarity instruction via the first wireless communication path from the verification controller to the plurality of other portions of the process control system;
    in response to receiving the reverse polarity instruction in the first portion of the process control system, transmitting a reverse polarity verification signal via the first wired communication path from the first portion of the process control system to the second portion of the process control system; and
    in response to receiving the reception signal in the verification controller, indicating the first wired communication path between the field device and the process controller has a reversed polarity.

11. A method as defined in claim 10, further comprising:
    if the verification controller does not receive the reception signal from the second portion of the process control system after transmitting the command signal including the reverse polarity instruction, transmitting a command signal including the reverse polarity instruction via the first wireless communication path from the verification controller to the plurality of other portions of the process control system;

in response to receiving the reception signal from the second portion of the process control system, determining to which portion of the process control system the corresponding command signal was sent; and indicating the portion of the process control system to which the corresponding command signal was sent as being communicatively coupled via the first wired communication path to the second portion of the process control system.

12. A method as defined in claim 11, further comprising if the verification controller does not receive the reception signal from the second portion of the process control system after transmitting the command signal including the reverse polarity instruction to the plurality of other portions of the process control system, indicating the first portion of the process control system has a connection error.

13. A method as defined in claim 1, further comprising if the verification controller receives the reception signal from a third portion of the process control system instead of the second portion of the process control system, indicating the third portion of the process control system is communicatively coupled via the first wired communication path to the first portion of the process control system.

14. A method as defined in claim 1, further comprising:
sending from the verification controller a plurality of command signals to a first plurality of portions of the process control system, each command signal including a different period;

receiving in the verification controller a plurality of reception signals from a second plurality of portions of the process control system, each portion from the first plurality of portions of the process control system corresponding to a second portion from the second plurality of portions of the process control system; and determining in the verification controller if each portion from the first plurality of portions of the process control system is specified to be communicatively coupled to the respective second portion from the second plurality of portions of the process control system.

15. The method as defined in claim 1, wherein the second wireless communication path bypasses the first portion of the process control system.

16. The method as defined in claim 1, wherein the verification controller is portable.

17. A system to verify a communication path between a field device and a process controller in a process control system, the system comprising:
a verification controller to transmit a command signal via a first wireless communication path or a second wireless communication path different than the first wireless communication path;

a verification junction box to transmit a verification signal via a first wired communication path in response to receiving the command signal from the verification controller via the first wireless communication path or to transmit a reception signal via the first wireless communication path in response to receiving the verification signal via the first wired communication path; and a process controller to transmit the reception signal via the second wireless communication path in response to receiving the verification signal via the first wired communication path or to transmit the verification signal via the first wired communication path in response to receiving the command signal via the second wireless communication path, wherein the verification controller is to verify the communication path between the field device and the process controller in response to receiving all of (a) the command signal in the verification junction box via the first wireless communication path, (b) the verification signal in the process controller via the first wired communication path, and (c) the reception signal in the verification controller via the second wireless communication path.

18. A system as defined in claim 17, further comprising:
an I/O card to receive the verification signal via the first wired communication path from the verification junction box and forward the verification signal to the process controller or to receive the verification signal from the process controller and forward the verification signal via the first wired communication path to the verification junction box; and a field device communicatively coupled to the verification junction box via a second wired communication path.

19. A system as defined in claim 18, wherein prior to transmitting the verification signal, the verification junction box determines if the field device is communicatively coupled to the verification junction box by sending a protocol signal to the field device and receiving a protocol response signal from the field device.

20. A system as defined in claim 18, wherein the process controller includes a workstation and is communicatively coupled to a plurality of I/O modules that are each communicatively coupled to a respective verification junction box via a respective communication path.

21. A system as defined in claim 18, wherein the reception signal includes at least one of an identification number of the I/O card or an identifier of the verification junction box.

22. A system as defined in claim 18, wherein:
a first portion of the process control system includes one of (a) the verification junction box and the field device or (b) the process controller, the workstation, and the I/O card; and a second portion of the process control system includes the other one of (a) the verification junction box and the field device or (b) the process controller, the workstation, and the I/O card.

23. A system as defined in claim 18, wherein before the field device is communicatively coupled to the verification junction box, the verification junction box transmits a verification signal via the first wired communication path in response to receiving the command signal from the verification controller or to transmit the reception signal via the first wireless communication path in response to receiving the verification signal via the first wired communication path.

24. A tangible machine-accessible storage medium, wherein the medium is not a signal, having instructions stored thereon that, when executed, cause a machine to at least:
transmit via a first wireless communication path to a first portion of a process control system associated with one of a field device or a process controller, a command signal from a verification controller;

in response to receiving the command signal in the first portion of the process control system, transmit a verification signal via a first wired communication path from the first portion of the process control system to a second portion of the process control system associated with the other one of the field device or the process controller;

in response to receiving the verification signal in the second portion of the process control system, transmit a reception signal via a second wireless communication path different than the first wireless communication path from the second portion of the process control system to the verification controller; and in response to receiving all of (a) the command signal in the first portion of the process control system via the first wireless communication path, (b) the verification signal in the second portion of the process control system via the first wired communication path, and (c) the reception signal in the verification controller via the second wireless communication path, verify the first wired communication path between the field device and the process controller.

25. The machine-accessible storage medium as defined in claim 24, wherein the second wireless communication path bypasses the first portion of the process control system.

26. The machine-accessible storage medium as defined in claim 24, wherein the verification controller is portable.

* * * * *